US012575473B2

(12) United States Patent
Suzuki et al.

(10) Patent No.: US 12,575,473 B2
(45) Date of Patent: Mar. 17, 2026

(54) ROUTE GENERATION METHOD, ROUTE GENERATION SYSTEM, AND ROUTE GENERATION PROGRAM

(71) Applicant: Yanmar Holdings Co., Ltd., Osaka (JP)

(72) Inventors: Shogo Suzuki, Okayama (JP); Shinnosuke Miyamoto, Okayama (JP); Keisuke Iwamura, Okayama (JP); Dai Uehara, Okayama (JP)

(73) Assignee: Yanmar Hildings Co., Ltd., Osaka (JP)

( * ) Notice: Subject to any disclaimer, the term of this patent is extended or adjusted under 35 U.S.C. 154(b) by 212 days.

(21) Appl. No.: 18/121,010

(22) Filed: Mar. 14, 2023

(65) Prior Publication Data

US 2023/0309434 A1     Oct. 5, 2023

(30) Foreign Application Priority Data

Mar. 31, 2022    (JP) ................................. 2022-059516

(51) Int. Cl.
   *G05D 1/00*        (2024.01)
   *A01B 69/04*      (2006.01)
(52) U.S. Cl.
   CPC ......... *A01B 69/008* (2013.01); *G05D 1/0044* (2013.01); *G05D 1/0219* (2013.01)

(58) Field of Classification Search
   CPC .. A01B 69/008; G05D 1/0044; G05D 1/0219; G05D 1/0061; G05D 1/0278; G05D 1/2297; G05D 1/646; G05D 1/0212; G05D 2105/15; G01C 21/20
   See application file for complete search history.

(56) References Cited

U.S. PATENT DOCUMENTS

2017/0112045 A1 *   4/2017   Dix ...................... A01B 79/005
2017/0339821 A1 *  11/2017   Ray ........................ B60K 35/28
2019/0227561 A1     7/2019   Hiramatsu
2020/0033856 A1     1/2020   Nishii

FOREIGN PATENT DOCUMENTS

EP        3395139 A1   10/2018
EP        3854191 A1    7/2021
EP        3940493 A1    1/2022

* cited by examiner

*Primary Examiner* — Bao Long T Nguyen
(74) *Attorney, Agent, or Firm* — Chris Mizumoto

(57)        ABSTRACT

A setting processing unit sets a set azimuth that is an angle with respect to a reference orientation, and sets a reference point at a predetermined location in a field. A generation processing unit generates a target route on the basis of the set azimuth and a reference line passing through the reference point.

12 Claims, 22 Drawing Sheets

REGISTER POINT B

MANUAL TRAVEL

REGISTER POINT A

POINT B

REFERENCE LINE L1

POINT A

R

L1

POINT B

POINT A

CAN START ASSISTING STRAIGHT TRAVEL

PRESS AUTO SWITCH

73

AUTOMATIC MACHINE
OPERATION

CAN START ASSISTING STRAIGHT TRAVEL

73

AUTOMATIC MACHINE
OPERATION

| | SET AZIMUTH INFORMATION | | | |
|---|---|---|---|---|
| REGISTRATION DATE | FIELD | WORK VEHICLE | WORK TYPE | SET AZIMUTH |
| yy/mm/dd | FIELD Fa | WORK VEHICLE A | WORK Wa | ANGLE Da |
| yy/mm/dd | FIELD Fa | WORK VEHICLE A | WORK Wa | ANGLE Da |
| yy/mm/dd | FIELD Fa | WORK VEHICLE B | WORK Wb | ANGLE Db |
| yy/mm/dd | FIELD Fa | WORK VEHICLE C | WORK Wc | ANGLE Dc |
| yy/mm/dd | FIELD Fa | WORK VEHICLE A | WORK Wa | ANGLE Da |
| ... | ... | ... | ... | ... |

ROUTE GENERATION METHOD, ROUTE GENERATION SYSTEM, AND ROUTE GENERATION PROGRAM

CROSS-REFERENCE

This application claims foreign priority of JP2022-059516, filed Mar. 31, 2022, the disclosure of which is hereby incorporated by reference in its entirety.

TECHNICAL FIELD

The present invention relates to a route generation method, a route generation system, and a route generation program for generating a target route on which a work vehicle travels autonomously in a field.

BACKGROUND ART

Conventionally, a technique of generating a target route on which a work vehicle travels autonomously in a field has been known. For example, the following technique has been known. A first location (a reference start point) and a second location (a reference end point) in the field are acquired. A line segment that connects the reference start point and the reference end point is registered as a reference line. Then, a straight route (the target route) that is parallel to the reference line is set, and the work vehicle is made to travel autonomously along the straight route (for example, see Patent Document 1).

PRIOR ART DOCUMENT

Patent Document

Patent Document 1: Japanese Unexamined Patent Application No. 2021-166528

SUMMARY OF INVENTION

Technical Problem

However, in the conventional technique, an operator has to manually drive the work vehicle in order to acquire the reference start point and the reference end point. For example, the operator moves the work vehicle to a desired location and registers the reference start point. Thereafter, the operator further manually drives the work vehicle and registers the reference end point at another desired location. Just as described, in the conventional technique, there is a problem that the work to generate the target route is burdensome.

The present invention has a purpose of providing a route generation method, a route generation system, and a route generation program capable of improving workability of work to generate a target route on which a work vehicle travels autonomously in a field.

Solution to Problem

A route generation method according to the present invention is a route generation method for generating a target route on which a work vehicle travels autonomously in a field and executing: setting a set angle that is an angle with respect to a reference orientation; setting a reference point at a predetermined location in the field; and generating the target route on the basis of the set angle and a reference line that passes through the reference point.

A route generation system according to the present invention includes a first setting processing unit, a second setting processing unit, and a generation processing unit. The first setting processing unit sets a set angle that is an angle with respect to a reference orientation. The second setting processing unit sets a reference point at a predetermined location in the field. The generation processing unit generates the target route on the basis of the set angle and a reference line that passes through the reference point.

A route generation program according to the present invention is a route generation program for generating a target route on which a work vehicle travels autonomously in a field and causing one or plural processors to execute: setting a set angle that is an angle with respect to a reference orientation; setting a reference point at a predetermined location in the field; and generating the target route on the basis of the set angle and a reference line that passes through the reference point.

Advantageous Effects of Invention

According to the present invention, it is possible to provide the route generation method, the route generation system, and the route generation program capable of improving workability of work to generate the target route on which the work vehicle travels autonomously in the field.

BRIEF DESCRIPTION OF DRAWINGS

FIG. 20 is a table illustrating an example of set azimuth information that is stored in the work vehicle according to the embodiment of the present invention.

DESCRIPTION OF EMBODIMENTS

The following embodiment is an example that embodies the present invention, and is not intended to limit the technical scope of the present invention.

Figure 1:
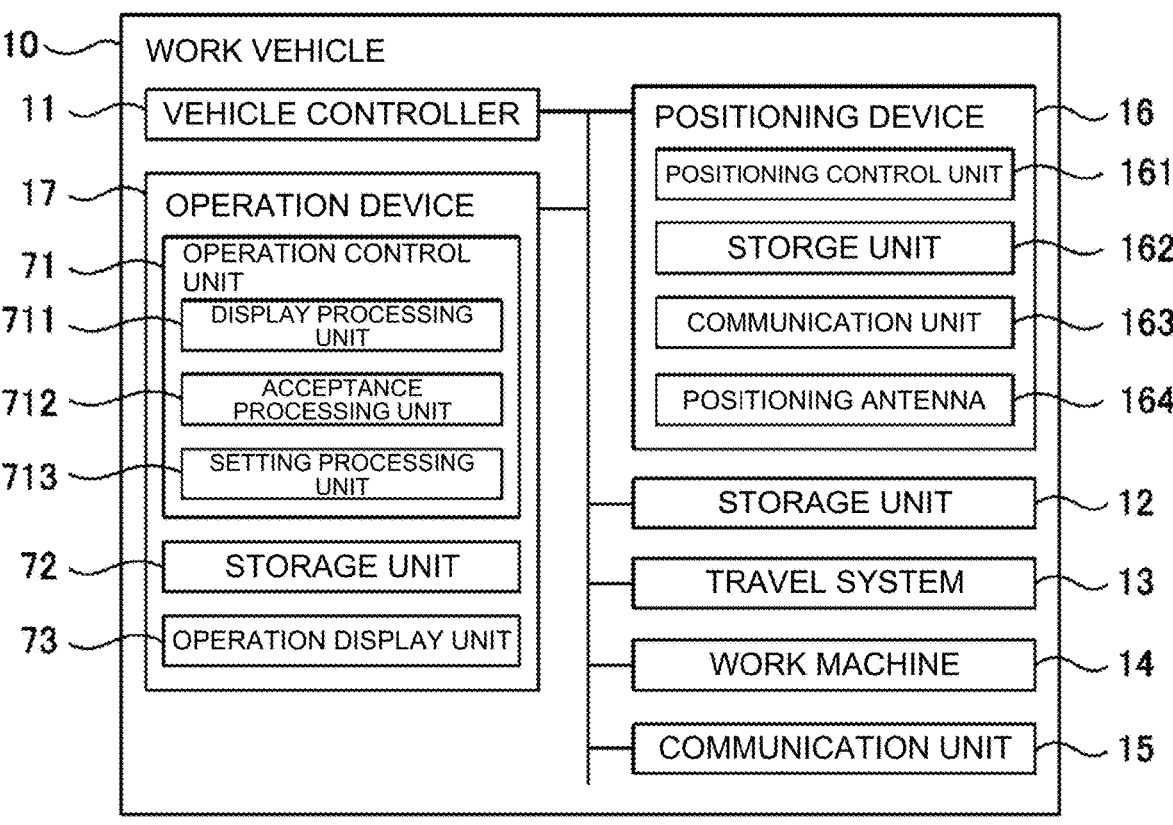
FIG. 1 is a block diagram illustrating a configuration of a work vehicle according to an embodiment of the present invention.
Figure 2:
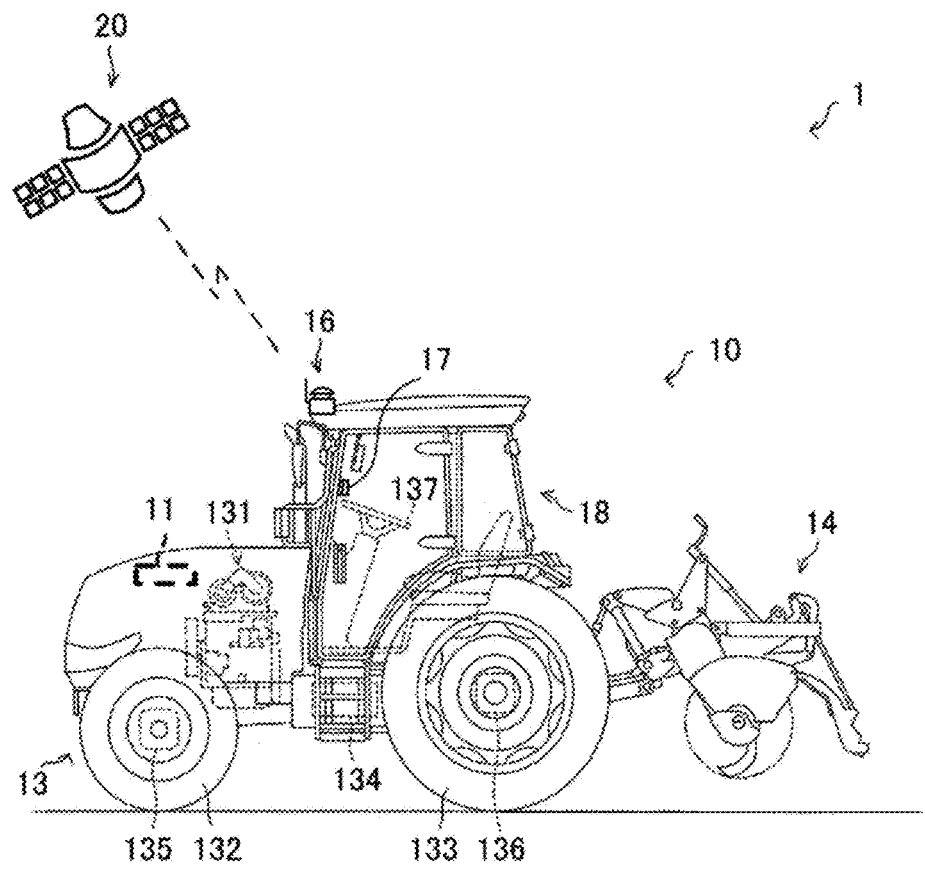
FIG. 2 is an external view illustrating an example of the work vehicle according of the embodiment of the present invention.

As illustrated in FIG. 1 and FIG. 2, an autonomous travel system 1 according to an embodiment of the present invention includes a work vehicle 10, a satellite 20, and a base station (not illustrated). In the present embodiment, a description will be made on a case where the work vehicle 10 is a tractor as an example. As another embodiment, the work vehicle 10 may be a rice transplanter, a combine harvester, a construction machine, a snowplow, or the like. In response to an operator's operation, the work vehicle 10 performs predetermined work (for example, tillage work) while traveling along a target route R in a field F (see FIG. 4). More specifically, the work vehicle 10 travels the target route R straight in response to automatic steering and makes a turn in response to manual steering (a driving operation) by the operator. The work vehicle 10 travels in the field F and performs the work while switching between the autonomous travel on the straight route and the manual travel on the turning route. The target route R may be generated in advance on the basis of the operator's operation and stored as route data. The work vehicle 10 may have a function of automatically increasing/reducing a vehicle speed (a vehicle speed control function). For example, the work vehicle 10 may automatically change the vehicle speed according to a travel route.

Figure 4:
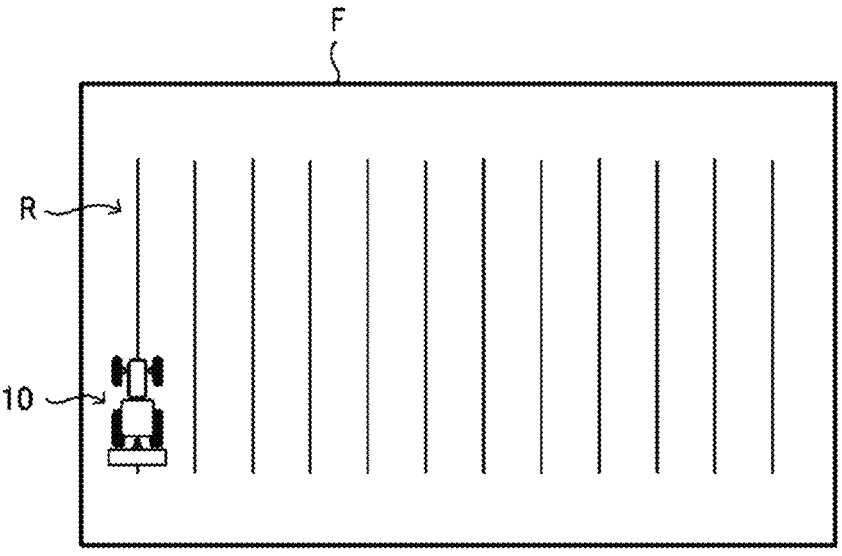
FIG. 4 is a view illustrating an example of a target route of the work vehicle according to the embodiment of the present invention.

For example, in the field F illustrated in FIG. 4, the work vehicle 10 travels by repeating the straight travel and the turning travel until the work is finished. The plural straight routes are substantially parallel to each other. The target route R illustrated in FIG. 4 is one example. The target route R is appropriately determined according to a size of the work vehicle 10, a size of a work machine 14, contents of the work, a shape of the field F, and the like.

The autonomous travel system 1 may include an operation terminal (a tablet terminal, a smartphone, or the like) that is operated by the operator. The operation terminal can communicate with the work vehicle 10 via a communication network such as a mobile phone network, a packet line network, or a wireless LAN. For example, the operator operates the operation terminal to register various types of information (such as work vehicle information, field information, and work information) and the like. In addition, at a location away from the work vehicle 10, the operator can comprehend a travel situation, a work situation, and the like of the work vehicle 10 from a travel locus that is displayed on the operation terminal.

[Work Vehicle 10]

As illustrated in FIG. 1 and FIG. 2, the work vehicle 10 includes a vehicle controller 11, a storage unit 12, a travel system 13, the work machine 14, a communication unit 15, a positioning device 16, an operation device 17, and the like. The vehicle controller 11 is electrically connected to the storage unit 12, the travel system 13, the work machine 14, the positioning device 16, the operation device 17, and the like. Here, the vehicle controller 11 and the positioning device 16 may be wirelessly communicable. The vehicle controller 11 and the operation device 17 may also be wirelessly communicable.

The communication unit 15 is a communication interface that connects the work vehicle 10 to the communication network in a wired/wireless manner for data communication with an external device (the operation terminal or the like) via the communication network according to a predetermined communication protocol.

The storage unit 12 is a non-volatile storage unit, such as a hard disk drive (HDD) or a solid state drive (SSD), that stores the various types of the information. The storage unit 12 stores a control program such as an autonomous travel program for causing the vehicle controller 11 to execute autonomous travel processing. For example, the autonomous travel program is recorded in a non-transitory manner in a computer-readable recording medium such as a CD or a DVD, is read by a predetermined reader (not illustrated), and is stored in the storage unit 12. However, the autonomous travel program may be downloaded to the work vehicle 10 from a server (not illustrated) via the communication network and stored in the storage unit 12. In addition, the storage unit 12 may store data on the target route R that is generated in the operation device 17.

The travel system 13 is a drive unit for driving the work vehicle 10. As illustrated in FIG. 2, the travel system 13 includes an engine 131, a front wheel 132, a rear wheel 133, a transmission 134, a front axle 135, a rear axle 136, a steering wheel 137, and the like. The front wheel 132 and the rear wheel 133 are each provided to right and left sides of the work vehicle 10. Here, the travel system 13 is not limited to that of a wheel type including the front wheels 132 and the rear wheels 133 but may be that of a crawler type including a crawler that is provided to the right and left sides of the work vehicle 10.

The engine 131 is a drive source, such as a diesel engine or a gasoline engine, that is driven by using fuel supplied to an unillustrated fuel tank. In addition to the engine 131, or instead of the engine 131, the travel system 13 may include an electric motor as the drive source. A generator, which is not illustrated, is connected to the engine 131, and electric power is supplied from the generator to electrical components such as the vehicle controller 11, a battery, and the like that are provided in the work vehicle 10. The battery stores the electric power that is supplied from the generator. The electrical components such as the vehicle controller 11, the positioning device 16, and the operation device 17 provided in the work vehicle 10 can be driven by the electric power supplied from the battery even after the engine 131 is stopped.

Drive power of the engine 131 is transmitted to the front wheels 132 via the transmission 134 and the front axle 135 and is transmitted to the rear wheels 133 via the transmission 134 and the rear axle 136. The drive power of the engine 131 is also transmitted to the work machine 14 via a PTO shaft (not illustrated). The travel system 13 performs travel operation according to a command of the vehicle controller 11.

For example, the work machine 14 is a cultivator, a sowing machine, a mower, a plow, or a fertilizer and can be attached/detached to/from the work vehicle 10. Thus, the work vehicle 10 can perform any of various works by using the respective work machine 14. FIG. 2 illustrates a case where the work machine 14 is the cultivator. In the work vehicle 10, the work machine 14 may be supported by a lift mechanism, which is not illustrated, in a manner to be able to be lifted or lowered. The vehicle controller 11 can lift/lower the work machine 14 by controlling the lift mechanism.

The steering wheel 137 is an operation unit that is operated by the operator or the vehicle controller 11. For example, the travel system 13 changes an angle of the front wheel 132 by a hydraulic power steering mechanism (not illustrated) in response to an operation of the steering wheel 137 by the operator or the vehicle controller 11, so as to change an advancing direction of the work vehicle 10.

In addition to the steering wheel 137, the travel system 13 includes a shift lever, an accelerator, a brake, and the like that are operated by the vehicle controller 11. Then, in the travel system 13, a gear of the transmission 134 is switched to a forward gear, a reverse gear, or the like according to an operation of the shift lever by the vehicle controller 11, and a travel aspect of the work vehicle 10 is thereby switched to forward travel, reverse travel, or the like. In addition, the vehicle controller 11 operates the accelerator to control a speed of the engine 131. Furthermore, the vehicle controller 11 operates the brake to control rotation of the front wheels 132 and the rear wheels 133 with an electromagnetic brake.

The positioning device 16 is a communication device that includes a positioning control unit 161, a storage unit 162, a communication unit 163, a positioning antenna 164, and the like. For example, as illustrated in FIG. 2, the positioning device 16 is provided on top of a cabin 18 which the operator sits in. However, an installation location of the positioning device 16 is not limited to the cabin 18. Furthermore, the positioning control unit 161, the storage unit 162, the communication unit 163, and the positioning antenna 164 of the positioning device 16 may be dispersed at different locations in the work vehicle 10. As described above, the battery is connected to the positioning device 16, and the positioning device 16 can be operated even when the engine 131 is stopped. For example, a mobile phone terminal, the smartphone, the tablet terminal, or the like may be used in place of the positioning device 16.

The positioning control unit 161 is a computer system that includes one or plural processors and storage memory such as non-volatile memory and RAM. The storage unit 162 is non-volatile memory that stores: a positioning control program for causing the positioning control unit 161 to execute positioning processing; and data such as positioning information and movement information. For example, the positioning control program is recorded in the non-transitory manner in a computer-readable recording medium such as a CD or a DVD, is read by the predetermined reader (not illustrated), and is stored in the storage unit 162. However, the positioning control program may be downloaded to the positioning device 16 from the server (not illustrated) via the communication network and stored in the storage unit 162.

The communication unit 163 is a communication interface that connects the positioning device 16 to the communication network in the wired or wireless manner for the data communication with the external device such as a base station server via the communication network according to the predetermined communication protocol.

The positioning antenna 164 is an antenna that receives a radio wave (a GNSS signal) emitted from the satellite 20.

The positioning control unit 161 calculates a current location of the work vehicle 10 on the basis of the GNSS signal that is received by the positioning antenna 164 from the satellite 20. For example, in the case where the positioning antenna 164 receives the radio waves (emitted time, locus information, and the like) emitted from the plural satellites 20 at the time when the work vehicle 10 travels autonomously in the field F, the positioning control unit 161 calculates a distance between the positioning antenna 164 and each of the satellites 20 and calculates the current location (a latitude and a longitude) of the work vehicle 10 on the basis of the calculated distance. Alternatively, the positioning control unit 161 may adopt a real-time kinematic positioning method (an RTK-GPS positioning method (an RTK method)) to calculate the current location of the work vehicle 10 by using correction information that corresponds to the base station (a reference station) near the work vehicle 10. Just as described, the work vehicle 10 travels autonomously by using the positioning information acquired by the RTK method. Here, the current location of the work vehicle 10 may be the same location as the positioned location (for example, a location of the positioning antenna 164) or may be a location that deviates from the positioned location.

The operation device 17 is a device that is operated by the operator who rides in the work vehicle 10, displays the various types of the information, and accepts the operator's operation. More specifically, the operation device 17 accepts various setting operations from the operator by displaying various setting screens and displays information on the traveling work vehicle 10. A specific configuration of the operation device 17 will be described below.

The vehicle controller 11 includes control devices such as a CPU, ROM, and RAM. The CPU is a processor that executes various types of arithmetic processing. The ROM is a non-volatile storage unit that stores, in advance, control programs such as a BIOS and an OS for causing the CPU to execute the various types of the arithmetic processing. The RAM is a volatile or non-volatile storage unit that stores the various types of the information, and is used as transient storage memory (a workspace) for various types of processing executed by the CPU. Then, when the CPU executes the various control programs, which are stored in the ROM or the storage unit 12 in advance, the vehicle controller 11 controls the work vehicle 10. In addition, in the vehicle controller 11, the CPU executes the various types of the processing according to the autonomous travel program.

More specifically, the vehicle controller 11 controls the travel of the work vehicle 10. For example, when a travel mode of the work vehicle 10 is the manual travel (a manual travel mode), the vehicle controller 11 causes the work vehicle 10 to travel manually on the basis of the operator's operation (the manual steering). For example, the vehicle controller 11 acquires operation information that corresponds to the operator's driving operation such as a steering wheel operation, a gearshift operation, a shift lever operation, an accelerator operation, or a brake operation. Then, the vehicle controller 11 causes the travel system 13 to perform the travel operation on the basis of the operation information.

Meanwhile, when the travel mode of the work vehicle 10 is the autonomous travel (an autonomous travel mode), the vehicle controller 11 causes the work vehicle 10 to travel autonomously on the basis of location information (the positioning information) that indicates the current location of the work vehicle 10 positioned by the positioning control unit 161. For example, when the work vehicle 10 satisfies an autonomous travel start condition and the vehicle controller 11 acquires a travel start instruction from the operator, the vehicle controller 11 starts the autonomous travel of the work vehicle 10 on the basis of the positioning information. Then, the vehicle controller 11 causes the work vehicle 10 to travel autonomously along the target route R (the straight route) that is generated in advance.

The vehicle controller 11 can cause the work vehicle 10 to travel autonomously along the target route R (the straight route) that is generated according to a set route generation mode among plural route generation modes (a detailed description thereon will be made below) For example, in the case where the operator selects a first route generation mode, the vehicle controller 11 causes the work vehicle 10 to travel autonomously along the target route R that is generated in the first route generation mode. For example, in the case where the operator selects a second route generation mode, the vehicle controller 11 causes the work vehicle 10 to travel autonomously along the target route R that is generated in the second route generation mode. For example, in the case where the operator selects a third route generation mode, the vehicle controller 11 causes the work vehicle 10 to travel autonomously along the target route R that is generated in the third route generation mode. The operation device 17 executes setting processing of the route generation mode.

The autonomous travel system 1 according to the present embodiment has the three route generation modes (the first route generation mode, the second route generation mode, and the third route generation mode). However, the present invention is not limited thereto. A detailed description on the route generation modes will be made below.

When the work vehicle 10 arrives at an end of the straight route, the vehicle controller 11 switches the travel mode to the manual travel. The vehicle controller 11 may switch the travel mode to the manual travel when determining that the work vehicle 10 has arrived at the end, or may switch the travel mode to the manual travel in response to the operator's operation. When the travel mode is switched to the manual travel, for example, the operator performs the turning travel (the manual travel) of the work vehicle 10 by the manual steering.

As described so far, the vehicle controller 11 switches the travel mode in response to the operator's operation on the operation device 17, causes the work vehicle 10 to travel autonomously on the straight route (the target route R) by the automatic steering, and causes the work vehicle 10 to travel manually on the turning road by the manual steering.

Here, the target route R (the straight route) on which the work vehicle 10 travels autonomously is generated on the basis of the operator's work (route generation work). In the related art, in the route generation work, the operator has to drive the work vehicle 10 manually in order to acquire a reference start point (a point A) and a reference end point (a point B). For example, the operator moves the work vehicle 10 to a desired location and registers the point A. Thereafter, the operator further manually drives the work vehicle 10 and registers the point B at another desired location. This creates a problem of the burdensome route generation work. Meanwhile, with the configuration in the present embodiment, it is possible to improve workability of the route generation work as will be described below. A description will hereinafter be made on a specific configuration of the operation device 17.

[Operation Device 17]

As illustrated in FIG. 1, the operation device 17 includes an operation control unit 71, a storage unit 72, an operation display unit 73, and the like. The operation device 17 may be a device that can be attached/detached to/from the work vehicle 10. Alternatively, the operation device 17 may be a mobile terminal (the tablet terminal, the smartphone, or the like) that can be carried by the operator. The operation device 17 is communicably connected to the vehicle controller 11 in the wired or wireless manner.

The operation display unit 73 is a user interface that includes: a display such as a liquid-crystal display or an organic EL display for displaying the various types of the information; and an operation unit such as operation buttons or a touch panel that accepts operations. The operation display unit 73 displays any of the various setting screens, work screens, and the like in response to an instruction from the operation control unit 71. In addition, the operation display unit 73 accepts the operator's operation on the setting screen or the work screen.

The operation unit includes: an autonomous travel button that is used by the operator to issue the travel start instruction when the operator starts the autonomous travel of the work vehicle 10; an offset button that is used for an offset operation (a correction operation) to correct a location deviation between the work vehicle 10 and the target route R; and plural selection buttons, each of which is used for a selection operation on the setting screen or the work screen (none of those is not be illustrated).

Figure 3:
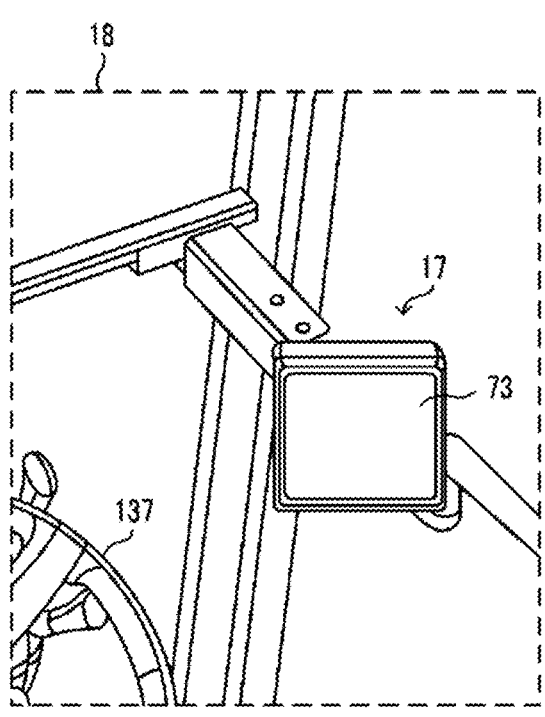
FIG. 3 is an external view illustrating an example of an operation device according to the embodiment of the present invention.

For example, as illustrated in FIG. 2 and FIG. 3, the operation device 17 is installed near the steering wheel 137 in the cabin 18.

The storage unit 72 is a non-volatile storage unit such as an HDD or an SSD that stores the various types of the information. The storage unit 72 stores a control program such as a route generation program for causing the operation device 17 to execute route generation processing (see FIG. 14 and FIG. 15), which will be described below. For example, the route generation program is recorded in the non-transitory manner in a computer-readable recording medium such as a CD and a DVD, is read by the predetermined reader (not illustrated), and is stored in the storage unit 72. However, the route generation program may be downloaded to the operation device 17 from a server (not illustrated) via the communication network and stored in the storage unit 72. The route generation program may be stored in the storage unit 12 of the work vehicle 10. In addition, the storage unit 72 may store the data on the target route R that is generated in the operation device 17.

The operation control unit 71 has control devices such as a CPU, ROM, and RAM. The CPU is the processor that executes the various types of the arithmetic processing. The ROM is the non-volatile storage unit that stores, in advance, the control programs such as the BIOS and the OS for causing the CPU to execute the various types of the arithmetic processing. The RAM is the volatile or non-volatile storage unit that stores the various types of the information, and is used as the transient storage memory (the workspace) for the various types of the processing executed by the CPU. Then, when the CPU executes the various control programs, which are stored in the ROM or the storage unit 72 in advance, the operation control unit 71 controls the operation device 17.

More specifically, as illustrated in FIG. 1, the operation control unit 71 includes various processing units such as a display processing unit 711, an acceptance processing unit 712, a setting processing unit 713, and a generation processing unit 714. The operation device 17 functions as each of the various processing units when the CPU executes the respective processing according to the route generation program. Some or all of the processing units may each be constructed of an electronic circuit. The route generation program may be a program that causes plural processors to function as the processing units.

The display processing unit 711 causes the operation display unit 73 to display the various types of the information. For example, the display processing unit 711 causes the operation display unit 73 to display any of the setting screens (FIGS. 5A and 5B, FIG. 7, FIG. 9, FIG. 13, and the like) on which various settings are made, any of work screens D1 (FIG. 11, FIG. 12, and the like) including travel information of the work vehicle 10 such as the travel situation and the work situation.

The acceptance processing unit 712 accepts the various operations by the operator. For example, the acceptance processing unit 712 accepts, on the setting screen, an operation to generate the target route R, that is, the various operations related to the route generation work from the operator.

The setting processing unit 713 identifies one of the plural route generation modes. Here, each of the plural route generation modes is the route generation mode in which the target route R is generated on the basis of a reference point (for example, the point A) that is set at a predetermined location in the field F. The setting processing unit 713 is an example of each of the first setting processing unit and the second setting processing unit in the present invention.

The plural route generation modes according to the present embodiment include the first route generation mode, the second route generation mode, and the third route generation mode. In the first route generation mode, the target route R is generated on the basis of a reference line L1 that passes through two reference points (the point A and the point B) set at the two locations in the field F according to the setting operation by the operator. In the second route generation mode, the target route R is generated on the basis of the reference line L1 that passes through the reference point (the point A) set at the location (for example, the current location) of the work vehicle 10 in the field and extends in a direction toward an orientation of the work vehicle 10 (a vehicle orientation). In the third route generation mode, the target route R is generated on the basis of the reference line L1 that passes through the reference point (the point A) set at the location (for example, the current location) of the work vehicle 10 in the field F and that extends in a direction toward a set azimuth d1 (a set angle) set according to the setting operation by the operator.

Figure 5A:
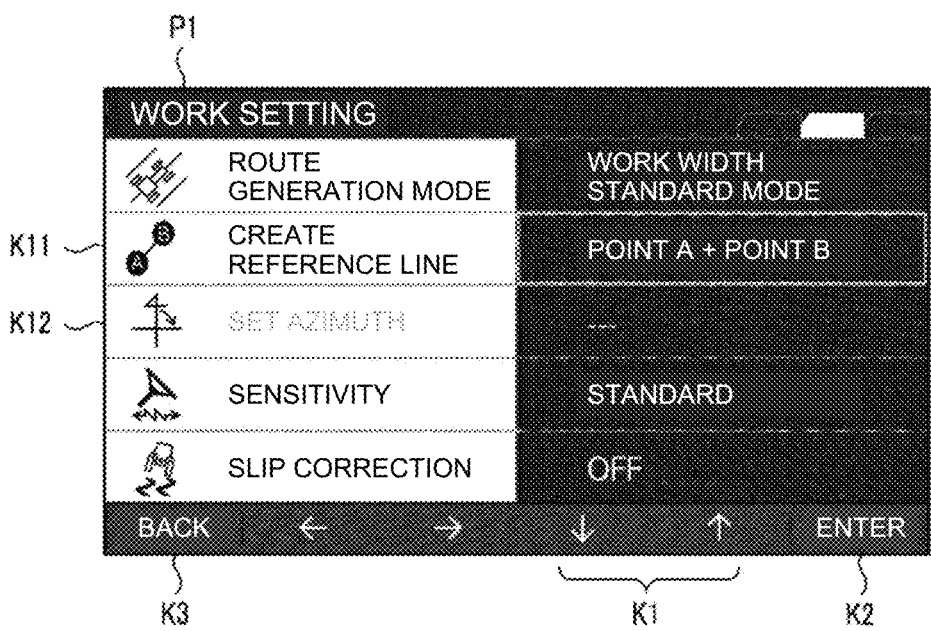
FIG. 5A is a view illustrating an example of a setting screen that is displayed in an operation device according to the embodiment of the present invention.

The operator can select any of the plural route generation modes. FIG. 5A illustrates an example of a setting screen P1. For example, when the operator selects a work setting (not illustrated) on a menu screen at the time of performing the route generation work, the display processing unit 711 causes the operation display unit 73 to display the setting screen P1.

The setting screen P1 includes: a setting item K11 ("CREATE REFERENCE LINE") to set the route generation mode; a setting item K12 ("SET AZIMUTH") to set the set azimuth; and the like. The operator can move a selection position of the setting item or a display page by pressing an operation button K1, can select the setting item by pressing an enter button K2, and can move the display page to the previous page by pressing a back button K3. Each of the buttons K1 to K3 is an example of the operation unit in the operation display unit 73.

Figure 5B:
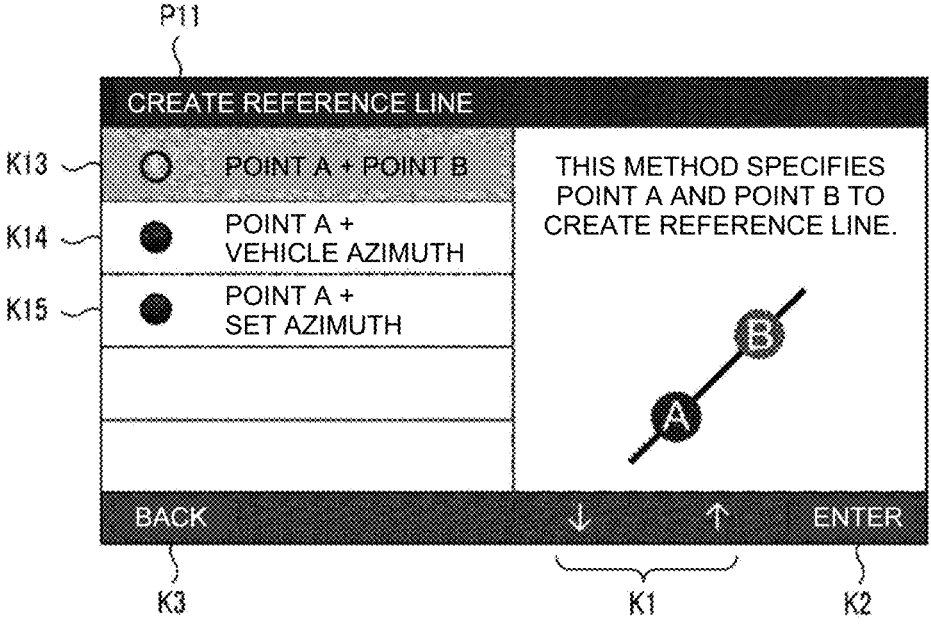
FIG. 5B is a view illustrating another example of the setting screen that is displayed in the operation device according to the embodiment of the present invention.

When the operator selects the setting item K11, the display processing unit 711 displays a setting screen P11 illustrated in FIG. 5B. On the setting screen P11, the display processing unit 711 displays selection fields for the plural route generation modes and explanatory information corresponding to each of the selection fields. In other words, the display processing unit 711 displays the setting screen P11 on which the selection operation of the route generation mode by the operator is accepted. The plural route generation modes include "POINT A+POINT B" (a setting item K13) that corresponds to the first route generation mode, "POINT A+VEHICLE AZIMUTH" (a setting item K14) that corresponds to the second route generation mode, and "POINT A+SET AZIMUTH" (a setting item K15) that corresponds to the third route generation mode. On the setting screen P11 illustrated in FIG. 5B, the operator can select any of the first route generation mode, the second route generation mode, and the third route generation mode.

The setting processing unit 713 identifies the route generation mode, which is selected by the operator, from the plural route generation modes. In addition, when the route generation mode is identified, the display processing unit 711 displays the work screen D1 on which the setting operation to set the reference line L1 passing through the reference point (the point A) is accepted from the operator. Then, the generation processing unit 714 generates the target route R in the route generation mode that is identified by the setting processing unit 713. More specifically, the generation processing unit 714 generates the target route R that includes the reference line L1 set according to the operator's setting operation. The generation processing unit 714 is an example of the generation processing unit in the present invention.

On each of the setting screens, the operation control unit 71 may provide voice output (voice guidance) of the explanatory information that corresponds to the setting item where a pointer such as a cursor or a mouse is located. For example, when the cursor is moved to the setting item K11 "CREATE REFERENCE LINE" on the setting screen P1 (see FIG. 5A), the operation control unit 71 outputs a voice message such as "Reference line creation is set to point A+point B". Alternatively, for example, when the cursor is moved to the setting item K15 "POINT A+SET AZIMUTH" on the setting screen P11 (see FIG. 9A), the operation control unit 71 outputs a voice message such as "Reference line is created from settings of point A and set azimuth". The operation control unit 71 may be able to switch ON/OFF of a voice output function.

[Specific Example of Route Generation Method]

Next, a description will be made on a specific example of a method for generating the target route R in each of the first route generation mode, the second route generation mode, and the third route generation mode.

[First Route Generation Mode]

When the operator selects "POINT A+POINT B" (the setting item K13) and presses the enter button K2 on the setting screen P11, the acceptance processing unit 712 accepts the operator's selection operation, and the setting processing unit 713 identifies the first route generation mode. Then, when the setting processing unit 713 identifies the first route generation mode, the display processing unit 711 causes the operation display unit 73 to display the work screen D1 (see FIG. 5C) on which the setting operation to set the reference line L1 is accepted from the operator. The operator moves the work vehicle 10 to a desired location in the field F and presses a point A registration button Ka. For example, the operator moves the work vehicle 10 to an outer circumferential end of the field F and presses the point A registration button Ka. When the operator presses the point A registration button Ka, the setting processing unit 713 registers the current location of the work vehicle 10 as a first reference point (the point A). After the setting processing unit 713 registers the point A, the display processing unit 711 causes the operation display unit 73 to display the work screen D1 (see FIG. 5D) on which a registration operation of a second reference point (the point B) is accepted. The operator drives the work vehicle 10 manually in a direction (a target direction) in which the operator wants the work vehicle 10 to travel and work (see FIG. 6A). More specifically, the operator drives the work vehicle 10 straight in a direction that is parallel to a work direction (a tillage direction, for example) at the time when the work vehicle 10 works at the workspace. Then, the operator then presses a point B registration button Kb (see FIG. 5D) at another desired location (for example, the outer circumferential end of the field F). When the operator presses the point B registration button Kb, the setting processing unit 713 registers the current location of the work vehicle 10 as the second reference point (the point B).

Figure 6A:
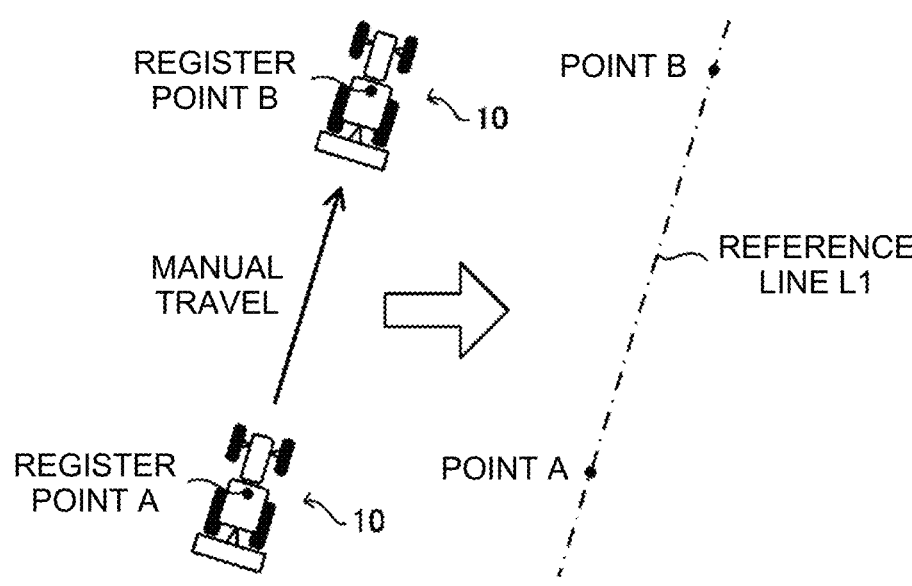
FIG. 6A is a view for explaining a route generation method in a first route generation mode according to the embodiment of the present invention.
Figure 6B:
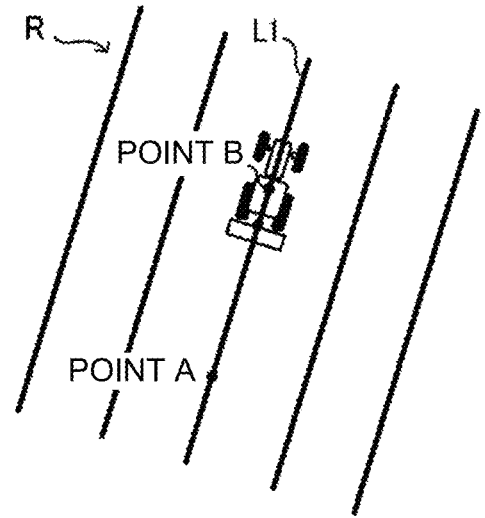
FIG. 6B is a view for explaining the route generation method in the first route generation mode according to the embodiment of the present invention.

When acquiring location information of the point A and the point B, the setting processing unit 713 sets a straight line that passes through the point A and the point B as the reference line L1 (see FIG. 6A). Here, the setting processing unit 713 may be able to adjust an orientation of the created reference line L1. For example, the setting processing unit 713 displays the created reference line L1 on the work screen D1, and sets (registers) the reference line L1 when accepting the registration operation from the operator. Meanwhile, when accepting an operation (for example, a screen touch operation or the like) to change the orientation of the reference line L1 from the operator, the setting processing unit 713 adjusts the orientation of the reference line L1 according to the operation. When accepting the operation to register the point B, the setting processing unit 713 may display a selection screen for registering or adjusting the reference line L1. The generation processing unit 714 generates the travel route (the target route R) including the reference line L1 and plural straight lines that are parallel to the reference line L1. For example, based on a work width (a lateral width of the work machine 14) and a lap width (a width that overlaps an adjacent worked area), which are set in advance, the generation processing unit 714 generates the plural parallel straight lines at equally-spaced intervals in a right and left direction with the reference line L1 being a center (see FIG. 6B). The generation processing unit 714 registers the generated target route R in the storage unit 72 and causes the operation display unit 73 to display the generated target route R.

According to the first route generation mode, it is possible to generate the target route R by using the reference line L1 that passes through the two points (the point A and the point B) at both ends of the field F and thus to improve work accuracy by the work vehicle 10. Here, the setting processing unit 713 may be able to register the point B in the case where the work vehicle 10 travels for a predetermined distance (for example, 5 m) after the point A is registered. In this way, it is possible to set the further accurate reference line L1.

[Second Route Generation Mode]

Figure 8A:
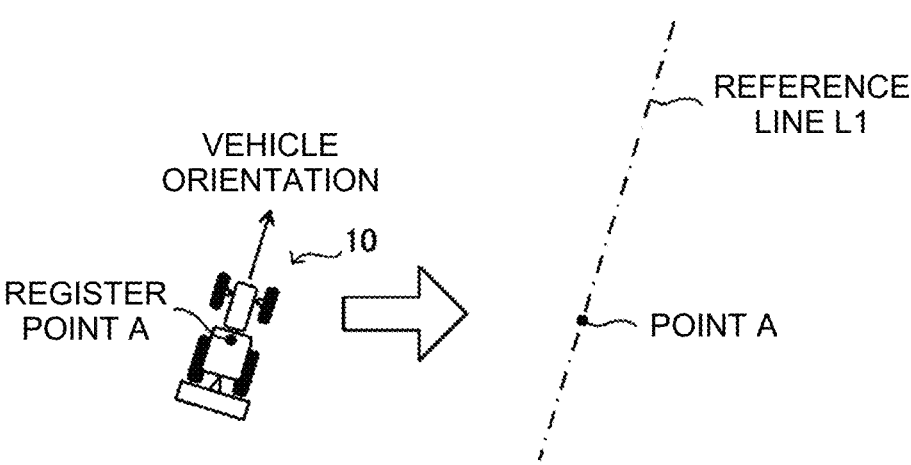
FIG. 8A is a view for explaining the route generation method in a second route generation mode according to the embodiment of the present invention.

When the operator selects "POINT A+VEHICLE AZIMUTH" (the setting item K14) and presses the enter button K2 on the setting screen P11 (see FIG. 7), the acceptance processing unit 712 accepts the operator's selection operation, and the setting processing unit 713 identifies the second route generation mode. Then, when the setting processing unit 713 identifies the second route generation mode, the display processing unit 711 causes the operation display unit 73 to display the work screen D1 (see FIG. 5C) on which the setting operation to set the reference line L1 is accepted from the operator. The operator moves the work vehicle 10 to the desired location in the field F and presses the point A registration button Ka (see FIG. 5C). For example, the operator moves the work vehicle 10 to a work start location in the field F and presses the point A registration button Ka. When the operator presses the point A registration button Ka, the setting processing unit 713 registers the location (the current location) of the work vehicle 10 as the reference point (the point A) (see FIG. 8A). After registering the point A, the setting processing unit 713 sets, as the reference line L1, a straight line that passes through the point A and extends in a direction of the current orientation of the work vehicle 10 (the vehicle orientation) (see FIG. 8A). In addition, the setting processing unit 713 sets the vehicle azimuth (the set angle in the present invention) that is an angle with respect to a reference orientation (for example, north). Here, the setting processing unit 713 may be able to adjust an orientation of the created reference line L1. For example, the setting processing unit 713 displays the created reference line L1 on the work screen D1, and sets (registers) the reference line L1 when accepting the registration operation from the operator. Meanwhile, when accepting an operation (for example, a screen touch operation or the like) to change the orientation of the reference line L1 from the operator, the setting processing unit 713 adjusts the orientation of the reference line L1 according to the operation. When accepting the operation to register the point A, the setting processing unit 713 may display the selection screen for registering or adjusting the reference line L1.

Figure 8B:
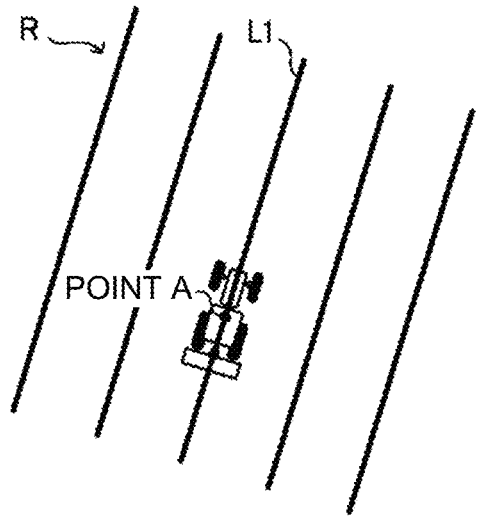
FIG. 8B is a view for explaining the route generation method in the second route generation mode according to the embodiment of the present invention.

The generation processing unit 714 generates the travel route (the target route R) including the reference line L1 and the plural straight lines that are parallel to the reference line L1 (see FIG. 8B). The generation processing unit 714 registers the generated target route R in the storage unit 72 and causes the operation display unit 73 to display the generated target route R.

Just as described, in the second route generation mode, the operation control unit 71 sets the vehicle azimuth that is the vehicle orientation with respect to the reference orientation (the north), sets the reference point (the point A) at the predetermined location in the field F, and generates the target route R (the straight route) on the basis of the vehicle azimuth and the reference line L1 passing through the point A. In addition, the operation control unit 71 generates the target route R including the reference line L1 that passes through the point A and extends at the vehicle azimuth with respect to the reference orientation. According to the second route generation mode, the operator can generate the target route R, which corresponds to the orientation of the work vehicle 10, by registering the point A. Therefore, it is possible to improve the workability of the route generation work.

[Third Route Generation Mode]

When the operator selects "POINT A+SET AZIMUTH" (the setting item K15) and presses the enter button K2 on the setting screen P11 (see FIG. 9A), the acceptance processing unit 712 accepts the operator's selection operation, and the setting processing unit 713 identifies the third route generation mode. Then, the display processing unit 711 displays the setting item K12 ("SET AZIMUTH") to be selectable on the setting screen P1 (see FIG. 9B). Here, in the case where the operator selects "POINT A+POINT B" (the setting item K13) or "POINT A+VEHICLE AZIMUTH" (the setting item K14), the display processing unit 711 may display (for example, gray out) the setting item K12 to be non-selectable or may hide the setting item K12. When the operator selects "SET AZIMUTH" (the setting item K12) and presses the enter button K2 on the setting screen P1 (see FIG. 9B), the acceptance processing unit 712 accepts the operator's selection operation, and the display processing unit 711 displays a setting screen P12 (see FIG. 9C).

The setting processing unit 713 sets the set azimuth d1 (the set angle in the present invention) that is an angle with respect to the reference orientation (for example, the north). For example, the display processing unit 711 displays an input field K16, into which the angle is input, on the setting screen P12, and the acceptance processing unit 712 accepts an angle input operation from the operator. For example, the operator operates the operation button K1 and inputs a desired angle. Then, the setting processing unit 713 sets the angle that is input by the operator as the set azimuth d1.

Here, in the case where a set azimuth d0 that is set in the past (the registered set azimuth) (an example of the registered set angle in the present invention) is stored in the storage unit 72 in advance, the setting processing unit 713 may set the set azimuth d0 as the set azimuth d1. Alternatively, the display processing unit 711 may display, as an initial angle, the set azimuth d0 in the input field K16, and the acceptance processing unit 712 may accept a change operation of the initial angle from the operator. In the case where the acceptance processing unit 712 accepts the change operation, the setting processing unit 713 sets the changed angle as the set azimuth d1. After the setting processing unit 713 sets the set azimuth d1, the display processing unit 711 displays the set azimuth d1 ("72.0093 DEGREES" herein) in an explanation field for the setting item K12 on the setting screen P1 (see FIG. 9B). With the configuration to display the set azimuth d0 (the registered set azimuth) as the initial angle, the operator can use the set azimuth d0 as a guide when setting the set azimuth d1.

Figure 10A:
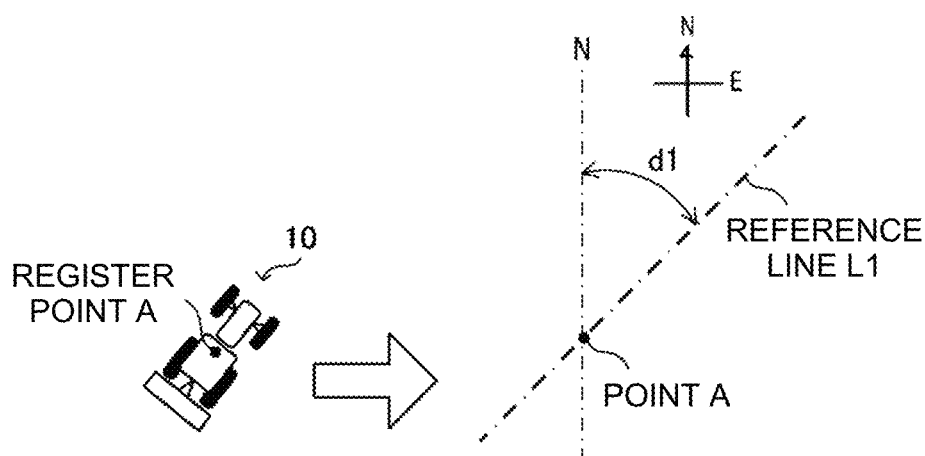
FIG. 10A is a view for explaining the route generation method in a third route generation mode according to the embodiment of the present invention.
Figure 10B:
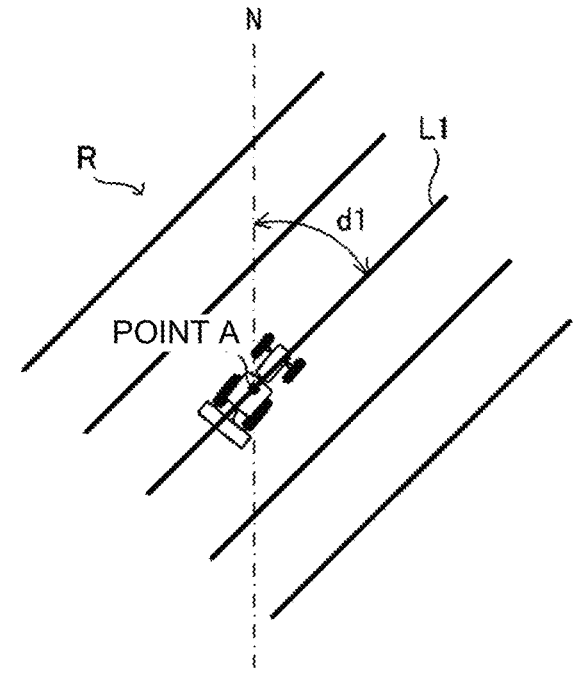
FIG. 10B is a view for explaining the route generation method in the third route generation mode according to the embodiment of the present invention.

In addition, when the setting processing unit 713 sets the set azimuth d1, the display processing unit 711 causes the operation display unit 73 to display the work screen D1 (see FIG. 5C) on which the setting operation to set the reference line L1 is accepted from the operator. The operator moves the work vehicle 10 to the desired location in the field F and presses the point A registration button Ka. For example, the operator moves the work vehicle 10 to the work start location in the field F and presses the point A registration button Ka (see FIG. 5C). When the operator presses the point A registration button Ka, the setting processing unit 713 registers the current location of the work vehicle 10 as the reference point (the point A). After registering the point A, the setting processing unit 713 sets, as the reference line L1, a straight line that passes through the point A and extends in a direction of the set azimuth d1 (see FIG. 10A). Here, the setting processing unit 713 may be able to adjust an orientation of the created reference line L1. For example, the setting processing unit 713 displays the created reference line L1 on the work screen D1, and sets (registers) the reference line L1 when accepting the registration operation from the operator. Meanwhile, when accepting an operation (for example, a screen touch operation or the like) to change the orientation of the reference line L1 from the operator, the setting processing unit 713 adjusts the orientation of the reference line L1 according to the operation. When accepting the operation to register the point A, the setting processing unit 713 may display the selection screen for registering or adjusting the reference line L1. The generation processing unit 714 generates the travel route (the target route R) including the reference line L1 and the plural straight lines that are parallel to the reference line L1 (see FIG. 10B). The generation processing unit 714 registers the generated target route R in the storage unit 72 and causes the operation display unit 73 to display the generated target route R.

Just as described, in the third route generation mode, the operation control unit 71 sets the set azimuth d1 that is the angle with respect to the reference orientation (the north), sets the reference point (the point A) at the predetermined location in the field F, and generates the target route R (the straight route) on the basis of the set azimuth d1 and the reference line L1 that passes through the point A. In addition, the operation control unit 71 generates the target route R including the reference line L1 that passes through the point A and extends at the set azimuth d1 with respect to the reference orientation.

The operation control unit 71 displays the setting screen P12 (see FIG. 9C) (an example of the first screen in the present invention), on which the input operation of the angle with respect to the reference orientation is accepted from the operator, and sets the angle input by the operator as the set azimuth d1. In addition, the operation control unit 71 displays the work screen D1 (see FIG. 5C) (an example of the second screen in the present invention) on which the setting operation of the point A is accepted from the operator. Then, when the setting operation of the point A on the work screen D1 is accepted from the operator, the operation control unit 71 generates the target route R (see FIG. 10B) and displays the target route R on the work screen D1.

According to the third route generation mode, the operator can generate the target route R by setting the set azimuth d1 and registering the point A. Therefore, it is possible to improve the workability of the route generation work while maintaining the work accuracy by the work vehicle 10.

In the third route generation mode, in the case where the target route R that has been generated once is changed (regenerated), the operator inputs the set azimuth d1 again, deletes the registered point A, and re-registers the point A. The operation control unit 71 may omit the operation to delete the point A. For example, when the operator performs the operation to change the set azimuth d1 and register the point A, the operation control unit 71 may update (overwrite) the registered point A with the newly registered point A.

Figure 5C:
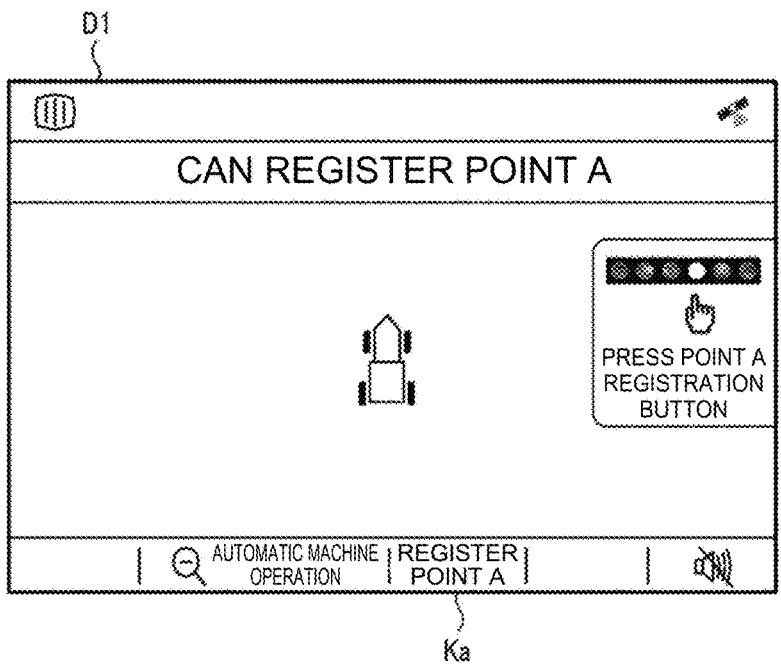
FIG. 5C is a view illustrating an example of a work screen that is displayed in the operation device according to the embodiment of the present invention.
Figure 5D:
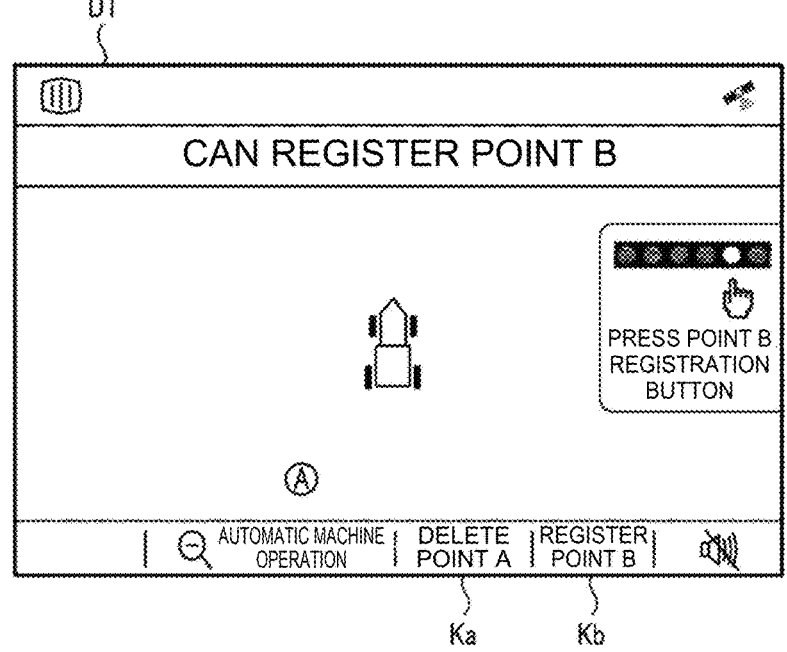
FIG. 5D is a view illustrating another example of the work screen that is displayed on the operation device according to the embodiment of the present invention.

As another embodiment of the third route generation mode, the operation control unit 71 may accept the input operation of the set azimuth d1 (see FIG. 9C) from the operator after setting the reference point (the point A) (see FIG. 5C). In this case, when the operator inputs the angle (the set azimuth d1) and presses the enter button K2 on the setting screen P12, the operation control unit 71 sets the set azimuth d1, and generates and displays the reference line L1 and the target route R (see FIGS. 10A and 10B).

As further another embodiment of the third route generation mode, the operation control unit 71 may set the current orientation of the work vehicle 10 as the set azimuth d1. Alternatively, the operation control unit 71 may display, as the initial angle, the current orientation of the work vehicle 10 in the input field K16 and accept the angle change operation from the operator. Further alternatively, the operation control unit 71 may be configured to set the current orientation of the work vehicle 10 as the set azimuth d1 or may be configured to display such an orientation in the input field K16 in the case where the operator sets the reference point (the point A) before setting the set azimuth d1.

As it has been described so far, the operation control unit 71 generates the target route R in the route generation mode that is selected by the operator from the plural route generation modes (the first route generation mode, the second route generation mode, and the third route generation mode). As another embodiment, in the case where the set azimuth d0 that is set in the past is stored in the storage unit 72 in advance, the setting processing unit 713 may identify the third route generation mode of the plural route generation modes without relying on the operator's selection operation. In other words, in the case where the set azimuth d0 is stored in the storage unit 72 in advance, the operation control unit 71 may generate the target route R in the third route generation mode.

After the target route R is generated, the operator issues an instruction (the travel start instruction) to the work vehicle 10 to start the autonomous travel in the field F. For example, when the work vehicle 10 satisfies the autonomous travel start condition and thus is brought into a state of enabling the autonomous travel, the operator can issue the travel start instruction. When acquiring the travel start instruction from the operator, the vehicle controller 11 executes the autonomous travel processing according to the set route generation mode.

Figure 11A:
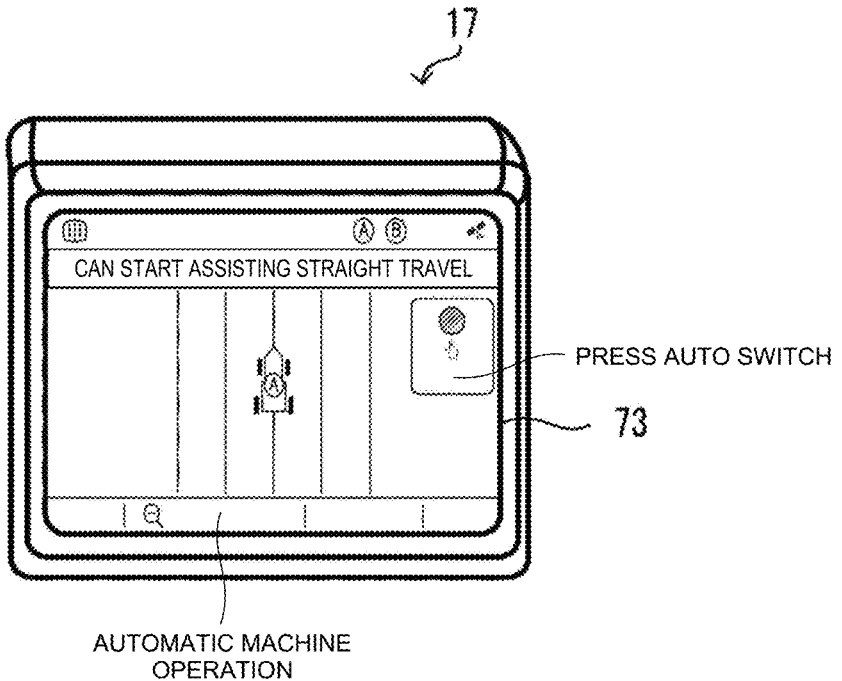
FIG. 11A is a view illustrating an example of the work screen that is displayed in the operation device according to the embodiment of the present invention.
Figure 12A:
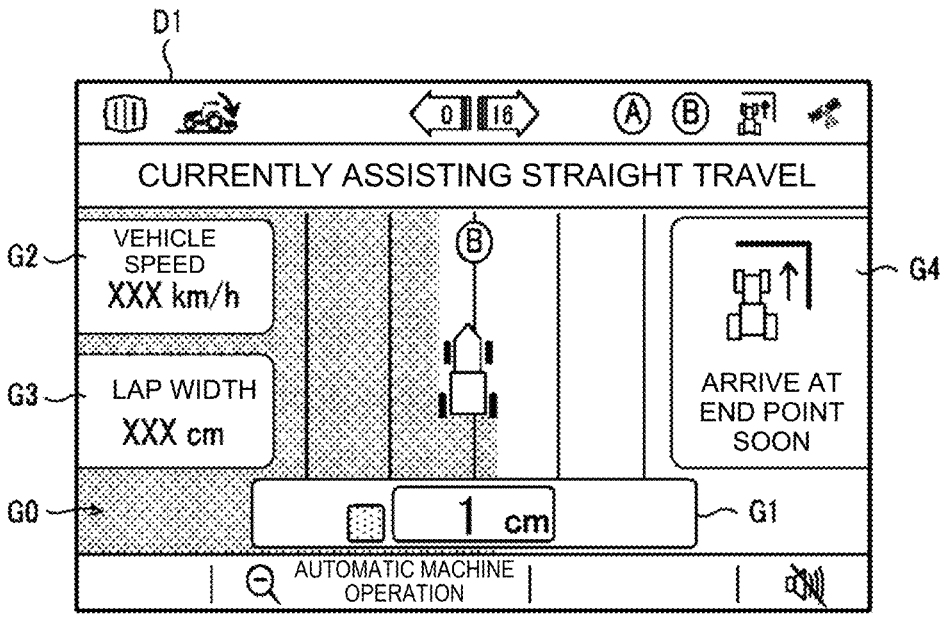
FIG. 12A is a view illustrating an example of the work screen that is displayed in the operation device according to the embodiment of the present invention.
Figure 12B:
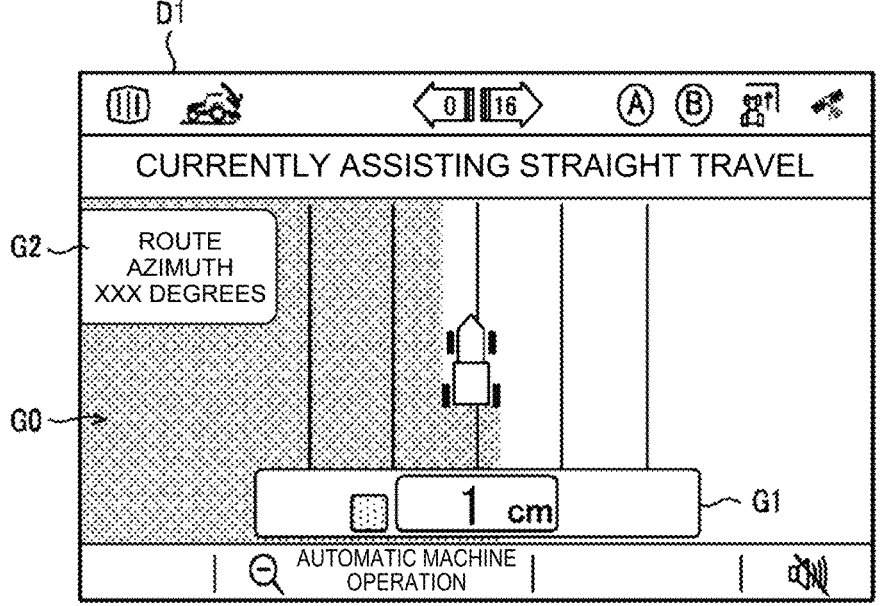
FIG. 12B is a view illustrating another example of the work screen that is displayed in the operation device according to the embodiment of the present invention.

FIG. 11A illustrates an operation screen (the work screen) showing that the work vehicle 10 satisfies the autonomous travel start condition and thus is brought into the state of enabling the autonomous travel. When the work vehicle 10 satisfies the autonomous travel start condition, the vehicle controller 11 causes the operation display unit 73 to display the operation screen illustrated in FIG. 11A. When the work vehicle 10 is brought into the state of enabling the autonomous travel, the operator presses the autonomous travel button (not illustrated) in the operation display unit 73 and issues the travel start instruction. When accepting the travel start instruction, the vehicle controller 11 starts the automatic steering of the work vehicle 10 such that the work vehicle 10 travels along the target route R, which is generated in the set route generation mode. In this way, the vehicle controller 11 causes the work vehicle 10 to travel autonomously along the straight route by the automatic steering.

Figure 11B:
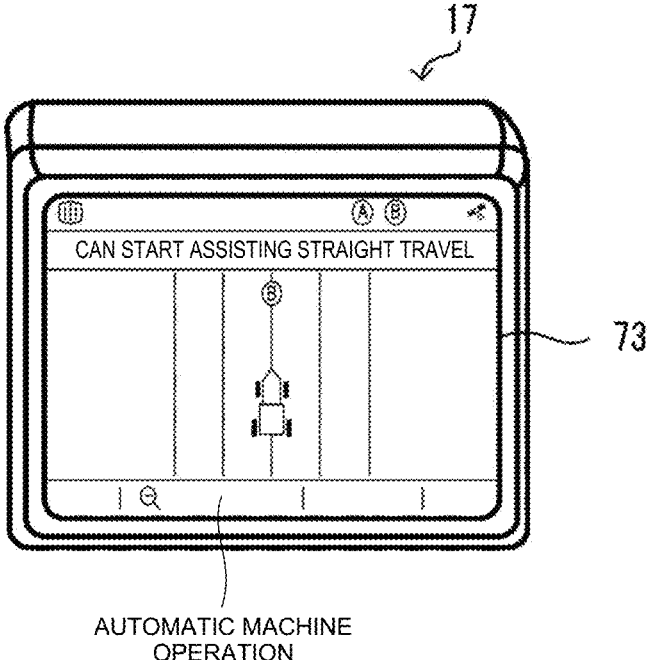
FIG. 11B is a view illustrating another example of the work screen that is displayed in the operation device according to the embodiment of the present invention.

FIG. 11B illustrates a display screen (the work screen) that is shown during the autonomous travel of the work vehicle 10. When the work vehicle 10 starts the autonomous travel, the vehicle controller 11 causes the operation device 17 to display the work screen illustrated in FIG. 11B. For example, based on the information (the travel information and the like) that is acquired from the vehicle controller 11, the operation device 17 displays the location of the work vehicle 10, the straight route, the worked area (the work situation), guidance information (operation guidance information), and the like on the work screen of the operation display unit 73.

Figure 6C:
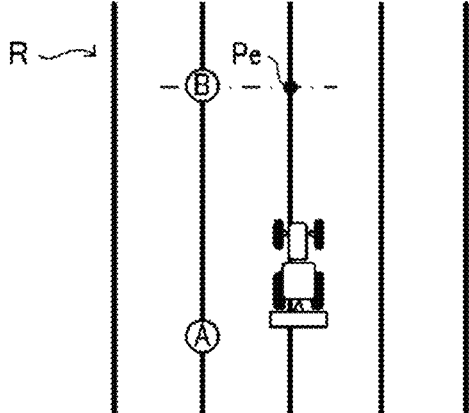
FIG. 6C is a view for explaining the route generation method in the first route generation mode according to the embodiment of the present invention.
Figure 7:
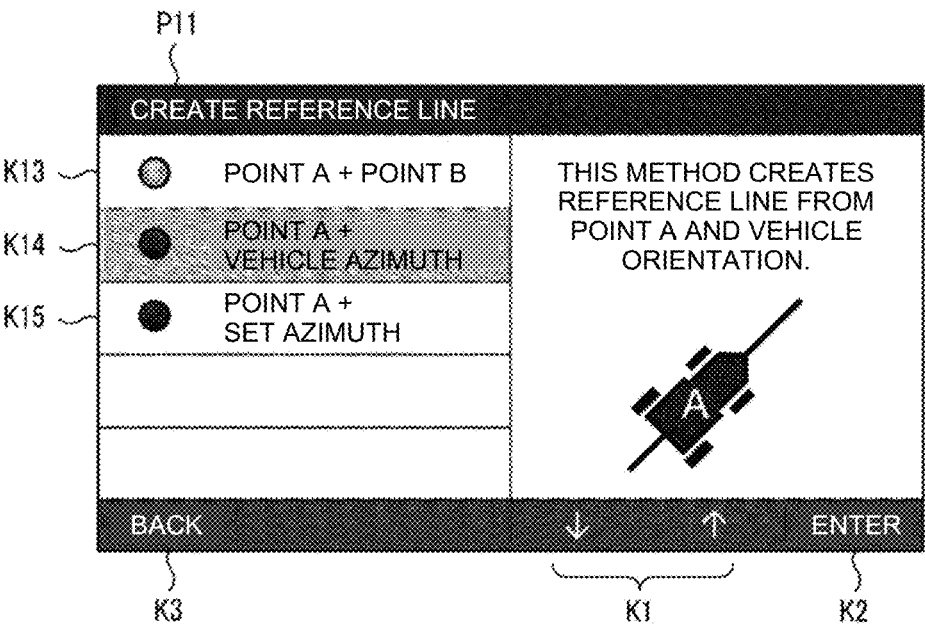
FIG. 7 is a view illustrating an example of the setting screen that is displayed in the operation device according to the embodiment of the present invention.

The vehicle controller 11 terminates the automatic steering at the end of the straight route. For example, in the first route generation mode, the vehicle controller 11 notifies the operator of the guidance information (travel information G4 (see FIG. 12A)) when the work vehicle 10 travels straight by the automatic steering and approaches an end Pe that corresponds to the point B of the reference line L1 (a point at an intersection of a perpendicular line through the point B to the reference line L1 with the straight route (a straight line)) (see FIG. 6C). Then, the vehicle controller 11 terminates the automatic steering in response to the operator's operation. Meanwhile, for example, in the second route generation mode and the third route generation mode, the vehicle controller 11 terminates the automatic steering in response to operator's operation.

The work screen D1 (see FIG. 12A) that is shown during the autonomous travel in the first route generation mode displays: travel information G0 including the location of the work vehicle 10, the target route R, the point B, and the worked area; travel information G1 indicating the location deviation of the work vehicle 10 from the target route R; travel information G2, G3 indicating the travel situation of the work vehicle 10; the travel information G4 indicating that the work vehicle 10 is approaching the end point; and the like.

Meanwhile, the work screen D1 (see FIG. 12B) that is shown during the autonomous travel in the second route generation mode and the third route generation mode displays: the travel information G0 including the location of the work vehicle 10, the target route R, and the worked area; the travel information G1 indicating the location deviation of the work vehicle 10 from the target route R; the travel information G2 indicating the travel situation of the work vehicle 10; and the like.

Here, the operator can set display contents of the travel information G2, G3. When the operator presses the operation button K1 and scrolls the page on the setting screen P1 (see FIG. 5A), the display processing unit 711 displays a setting screen P2 illustrated in FIG. 13A. The setting screen P2 includes: a setting item K21 ("INFORMATION DISPLAY 1") for whether to display the travel information G2 on the work screen D1 and selecting a display target; a setting item K22 ("INFORMATION DISPLAY 2") for whether to display the travel information G3 and the display target; and the like. After selecting the setting item K21 ("INFORMATION DISPLAY 1"), on a setting screen P21 (see FIG. 13B), the operator selects the display target to be displayed in the travel information G2. Similarly, after selecting the setting item K22 ("INFORMATION DISPLAY 2"), on the setting screen P21, the operator selects the display target to be displayed in the travel information G3.

Figure 13A:
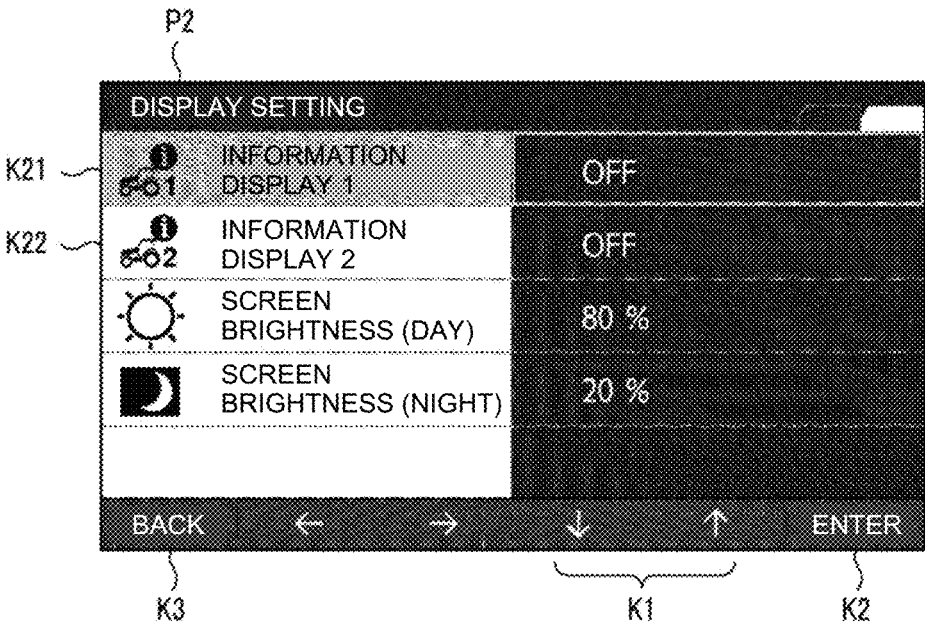
FIG. 13A is a view illustrating an example of the setting screen that is displayed in the operation device according to the embodiment of the present invention.
Figure 13B:
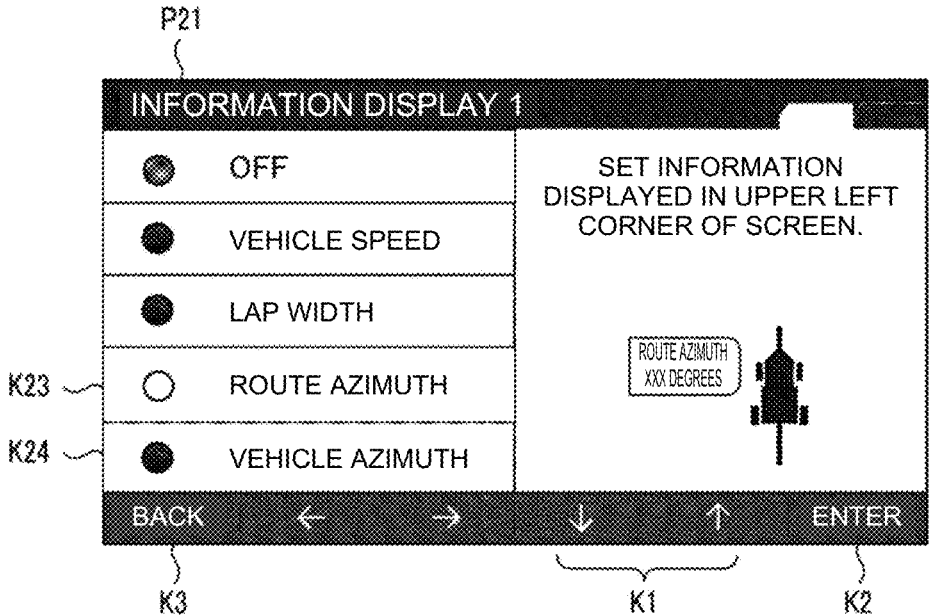
FIG. 13B is a view illustrating another example of the setting screen that is displayed in the operation device according to the embodiment of the present invention.

FIG. 13B illustrates a state where "ROUTE AZIMUTH" is selected in the third route generation mode. When the operator selects "ROUTE AZIMUTH" and presses the enter button K2, the display processing unit 711 displays "ROUTE AZIMUTH" as the travel information G2 on the work screen D1 (see FIG. 12B). Here, in the case where the operator sets the set azimuth (see FIG. 9C), the display processing unit 711 displays, as the route azimuth, the set azimuth as the travel information G2.

[Route Generation Processing]

Figure 14:
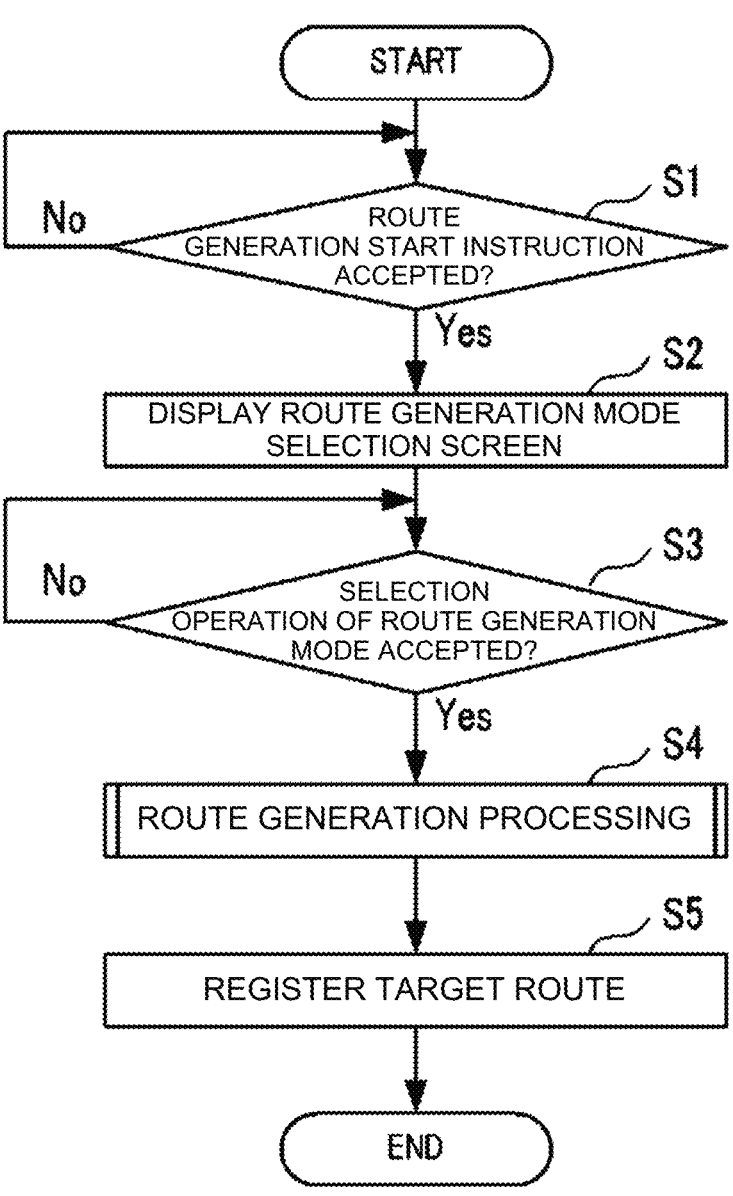
FIG. 14 is a flowchart illustrating an exemplary procedure for route generation processing that is executed by the operation device according to the embodiment of the present invention.

A description will hereinafter be made on an example of the route generation processing that is executed by the operation control unit 71 of the operation device 17 with reference to FIG. 14. The present invention may be comprehended as the invention of the route generation method by which the operation device 17 partially or entirely executes the route generation processing or the invention of the route generation program for causing the operation device 17 to partially or entirely execute the route generation method. One or plural processors may execute the route generation processing.

In step S1, the operation control unit 71 determines whether an instruction to start the generation processing of the target route R has been accepted from the operator. For example, the operator selects the work setting (not illustrated) on the menu screen when starting the work to generate the target route R (the route generation work). If the operation control unit 71 has accepted the selection operation of the work setting (the route generation start instruction) from the operator (S1: Yes), the processing proceeds to step S2. The operation control unit 71 stands by until accepting the route generation start instruction from the operator (S1: No).

In step S2, the operation control unit 71 displays the setting screen P11 (the route generation mode selection screen) on which the route generation mode is selected. For example, when the operator selects the work setting on the menu screen, the operation control unit 71 causes the operation display unit 73 to display the setting screen P1 illustrated in FIG. 5A. Meanwhile, when the operator selects the setting item K11 "CREATE REFERENCE LINE" on the setting screen P1, the operation control unit 71 displays the setting screen P11 (see FIG. 5B). On the setting screen P11, the operation control unit 71 displays, in the selectable manner: "POINT A+POINT B" (the setting item K13) corresponding to the first route generation mode; "POINT A+VEHICLE AZIMUTH" (the setting item K14) corresponding to the second route generation mode; and "POINT A+SET AZIMUTH" (the setting item K15) corresponding to the third route generation mode.

In step S3, the operation control unit 71 determines whether the selection operation of the route generation mode has been accepted. On the setting screen P11 (see FIG. 5B), the operator selects any of the setting items K13, K14, K15. If the operation control unit 71 has accepted the selection operation of the route generation mode from the operator (S3: Yes), the operation control unit 71 identifies the route generation mode, and the processing proceeds to step S4. The operation control unit 71 stands by until accepting the selection operation of the route generation mode from the operator (S3: No).

In step S4, the operation control unit 71 executes processing to generate the target route R on which the work vehicle 10 travels autonomously (the route generation processing). For example, in the case where the operator selects the setting item K13 ("POINT A+POINT B") (see FIG. 5B), the operation control unit 71 identifies the first route generation mode and generates the target route R in the first route generation mode (see FIG. 6). In addition, for example, in the case where the operator selects the setting item K14 ("POINT A+VEHICLE AZIMUTH") (see FIG. 7), the operation control unit 71 identifies the second route generation mode and generates the target route R in the second route generation mode (see FIG. 8). Furthermore, for example, in the case where the operator selects the setting item K15 ("POINT A+SET AZIMUTH") (see FIG. 9), the operation control unit 71 identifies the third route generation mode and generates the target route R in the third route generation mode (see FIG. 10).

In step S5, the operation control unit 71 registers the generated target route R in the storage unit 72. More specifically, the operation control unit 71 causes the operation display unit 73 to display the generated target route R. Then, when accepting the registration operation from the operator, the operation control unit 71 registers the target route R in the storage unit 72. The operation control unit 71 stores the target route R in the storage unit 12 of the work vehicle 10.

[Route Generation Processing in Third Route Generation Mode]

Figure 15:
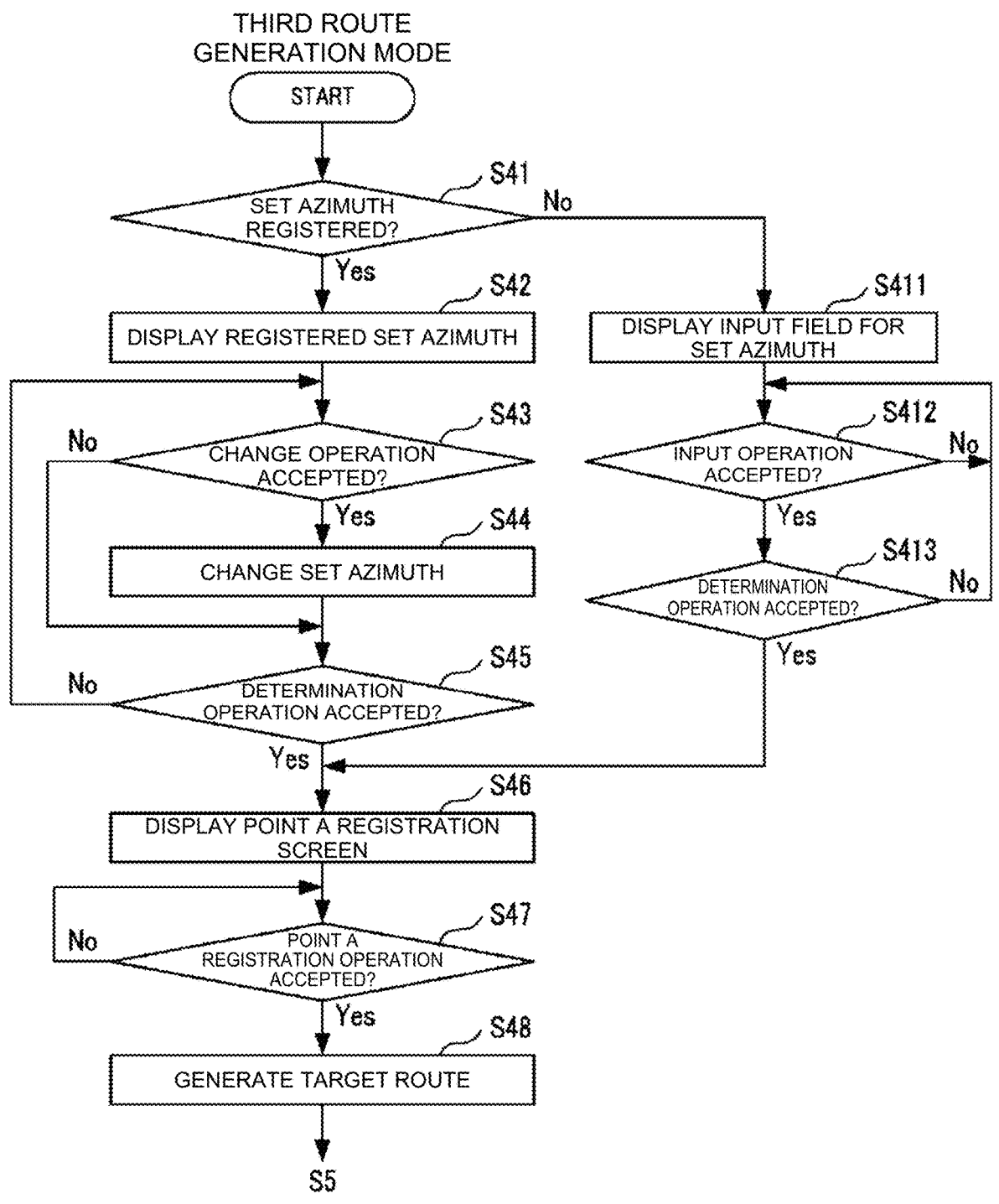
FIG. 15 is a flowchart illustrating the exemplary procedure for the route generation processing that is executed by the operation device according to the embodiment of the present invention.

A description will herein be made on an example of the route generation processing, which corresponds to the third route generation mode, of the route generation processing in step S4 with reference to FIG. 15. The operator selects the setting item K15 ("POINT A+SET AZIMUTH") (see FIG. 9A) and further selects (see FIG. 9B) the setting item K12 ("SET AZIMUTH") on the setting screen P1 (see FIG. 9B).

In step S41, the operation control unit 71 determines whether the set azimuth d0 that is set in the past (the registered set azimuth) is stored in the storage unit 72. If the set azimuth d0 is stored in the storage unit 72 (S41: Yes), the processing proceeds to step S42. On the other hand, if the set azimuth d0 is not stored in the storage unit 72 (S41: No), the processing proceeds to step S411.

Figure 9A:
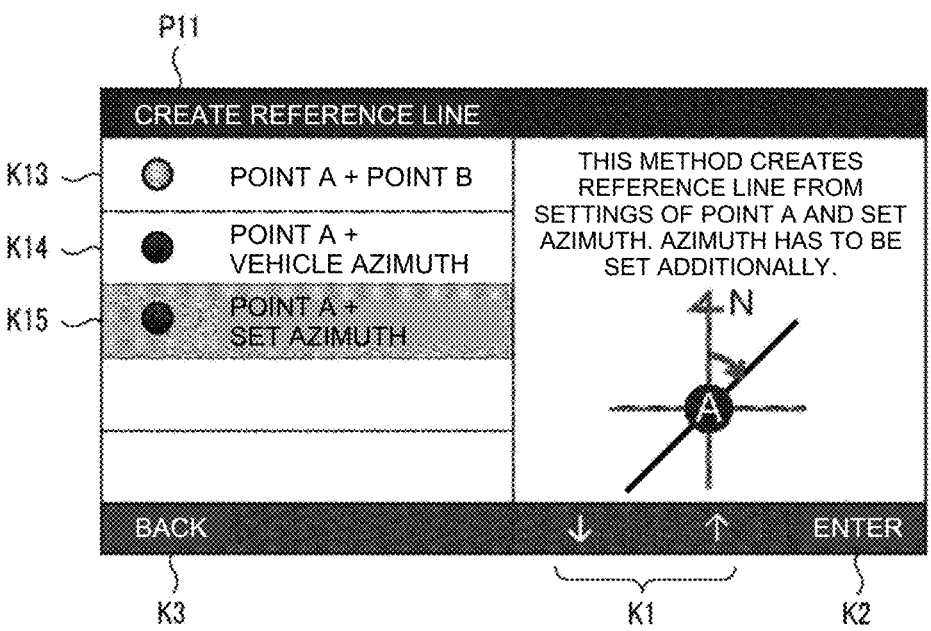
FIG. 9A is a view illustrating an example of the setting screen that is displayed in the operation device according to the embodiment of the present invention.
Figure 9B:
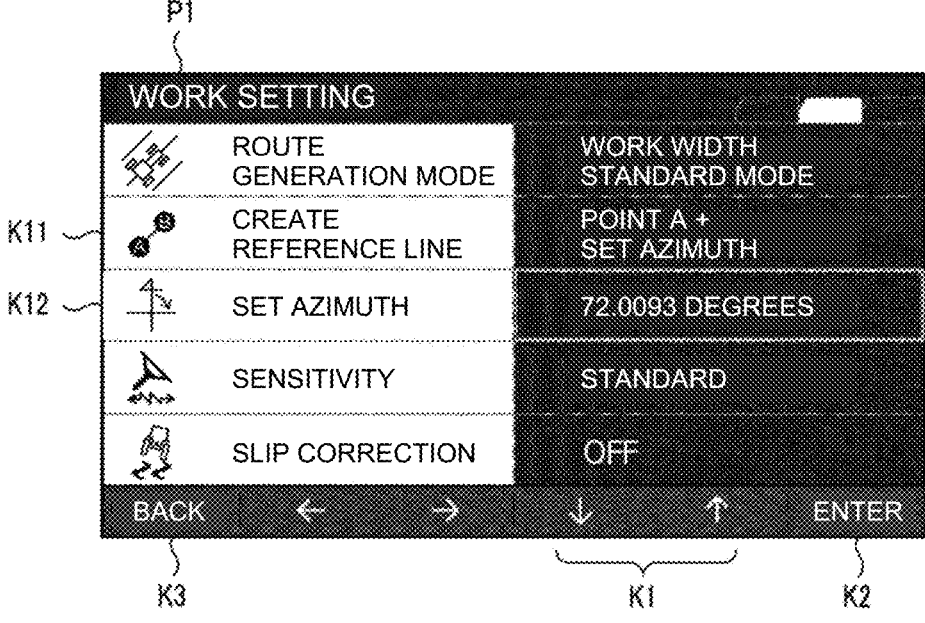
FIG. 9B is a view illustrating another example of the setting screen that is displayed in the operation device according to the embodiment of the present invention.
Figure 9C:
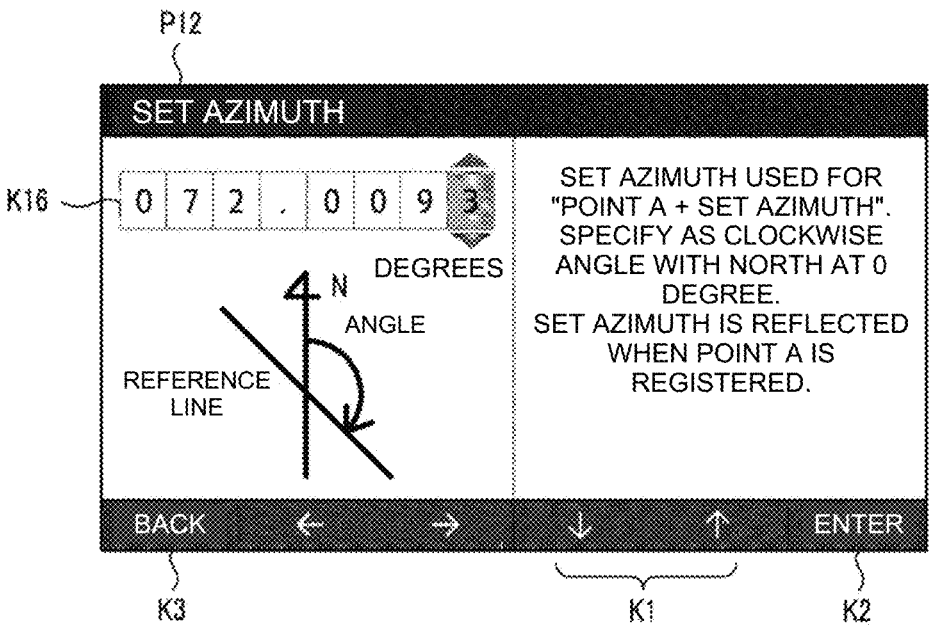
FIG. 9C is a view illustrating further another example of the setting screen that is displayed in the operation device according to the embodiment of the present invention.

In step S42, the operation control unit 71 displays the set azimuth d0 as the initial angle in the input field K16 of the setting screen P12 (see FIG. 9C).

In step S43, the operation control unit 71 determines whether the initial angle change operation has been accepted from the operator. When the operator wants to change the registered set azimuth d0, the operator operates the operation button K1 on the setting screen P12 (see FIG. 9C) to change the registered set azimuth d0 to the desired angle. If the operation control unit 71 has accepted the change operation (S43: Yes), the processing proceeds to step S44. On the other hand, if the operation control unit 71 has not accepted the change operation (S43: No), the processing proceeds to step S45.

In step S44, the operation control unit 71 changes the set azimuth d0 (the initial angle), which is displayed on the setting screen P12, in response to the operator's change operation.

In step S45, the operation control unit 71 determines whether a determination operation of the set azimuth d1 has been accepted. When determining the angle that is displayed in the input field K16 on the setting screen P12 (see FIG. 9C), the operator presses the enter button K2. When the operator presses the enter button K2, the operation control unit 71 accepts the determination operation. If the operation control unit 71 has accepted the setting operation (S45: Yes), the processing proceeds to step S46. On the other hand, if the operation control unit 71 has not accepted the setting operation (S45: No), the processing proceeds to step S43.

On the other hand, if the operation control unit 71 determines in step S41 that the set azimuth d0 is not stored in the storage unit 72 (S41: No), in step S411, the operation control unit 71 displays the input field K16 on the setting screen P12 (see FIG. 9C). Then, the operation control unit 71 accepts the angle input operation from the operator.

In step S412, the operation control unit 71 determines whether the input operation has been accepted from the operator. If the operation control unit 71 has accepted the input operation (S412: Yes), the processing proceeds to step S413. The operation control unit 71 stands by until accepting the input operation (S412: No).

In step S413, the operation control unit 71 determines whether the determination operation of the set azimuth d1 has been accepted. When determining the angle that is displayed in the input field K16 on the setting screen P12 (see FIG. 9C), the operator presses the enter button K2. When the operator presses the enter button K2, the operation control unit 71 accepts the determination operation. If the operation control unit 71 has accepted the setting operation (S413: Yes), the processing proceeds to step S46. On the other hand, if the operation control unit 71 has not accepted the setting operation (S413: No), the processing proceeds to step S412. The operation control unit 71 can accept the angle change operation from the operator until accepting the determination operation.

In step S46, the operation control unit 71 displays the work screen D1 (see FIG. 5C) on which the setting operation of the reference point (the point A) is accepted from the operator.

In step S47, the operation control unit 71 determines whether the registration operation to register the point A has been accepted from the operator. For example, the operator moves the work vehicle 10 to the work start location in the field F and presses the point A registration button Ka (see FIG. 5C). When the operator presses the point A registration button Ka, the operation control unit 71 accepts the registration operation. If the operation control unit 71 has accepted the registration operation from the operator (S47: Yes), the processing proceeds to step S48. The operation control unit 71 stands by until accepting the registration operation from the operator (S47: No).

In step S48, the operation control unit 71 generates the target route R. More specifically, when registering the current location of the work vehicle 10 as the point A, the operation control unit 71 sets, as the reference line L1, the straight line that passes through the point A and extends in the direction of the set azimuth d1 (see FIG. 10A). The operation control unit 71 generates the travel route (the target route R) including the reference line L1 and the plural straight lines that are parallel to the reference line L1 (see FIG. 10B). After step S48, in step S5 (see FIG. 14), the operation control unit 71 registers the generated target route R in the storage unit 72.

As described above, the operation control unit 71 executes the route generation processing to generate the target route R. The vehicle controller 11 causes the work vehicle 10 to travel autonomously along the target route R that is generated by the operation control unit 71.

As it has been described so far, the operation device 17 according to the present embodiment generates the target route R on which the work vehicle 10 travels autonomously in the field F. The operation device 17 identifies any of the plural route generation modes, in each of which the target route R is generated on the basis of the reference point (the point A) set at the predetermined location in the field F, and generates the target route R in the identified route generation mode. For example, the operation device 17 displays the plural route generation modes to be selectable (see FIG. 5B) and generates the target route R in the route generation mode selected by the operator.

In addition, when identifying (setting) the third route generation mode, the operation device 17 sets the set azimuth d1 with respect to the reference orientation (for example, the north), sets the reference point (the point A) at the predetermined location in the field F, and generates the target route R on the basis of the set azimuth d1 and the reference line L1 passing through the point A. Furthermore, when identifying (setting) the second route generation mode, the operation device 17 sets the vehicle azimuth with respect to the reference orientation (for example, the north), sets the reference point (the point A) at the predetermined location in the field F, and generates the target route R on the basis of the vehicle azimuth and the reference line L1 passing through the point A. Each of the set azimuth d1 and the vehicle azimuth is an example of the set angle. The operation device 17 may set the set azimuth d1 to the set angle, which is used to create the reference line L1, or may set the vehicle azimuth to the set angle, which is used to create the reference line L1.

With the above configuration, the operator can select the desired route generation mode from the plural route generation modes. For example, the operator can generate the target route R by selecting the route generation mode, in which a burden of the route generation work for generating the target route R is light (for example, the second route generation mode or the third route generation mode). For example, in the case where the operator selects the third route generation mode, the operator can generate the target route R by setting the set azimuth d1 and registering the only one reference point (point A). In addition, for example, in the case where the operator selects the second route generation mode, the operator can generate the target route R by setting the current orientation of the vehicle (the vehicle azimuth) and registering the only one reference point (point A). Thus, compared to the first route generation mode, in which the two reference points (the point A and the point B) are registered, it is possible to improve the workability of the route generation work.

Other Embodiments

The present invention is not limited to the above-described embodiment. A description will hereinafter be made on other embodiments of the present invention.

Figure 16:
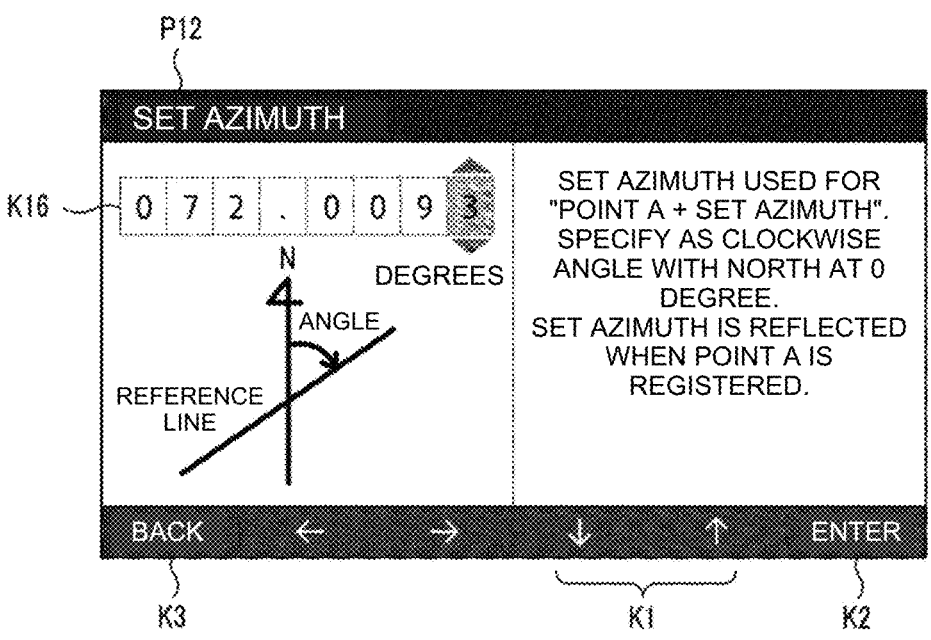
FIG. 16 is a view illustrating an example of the setting screen that is displayed in the operation device according to the embodiment of the present invention.

In the above-described embodiment, on the setting screen P12 illustrated in FIG. 9C, the display processing unit 711 displays an image showing the set azimuth d1 with respect to the reference orientation (for example, the north) and the reference line L1 as a fixed image (an explanatory image) regardless of the angle that is input into the input field K16. As another embodiment, as illustrated in FIG. 16, the display processing unit 711 may display the set azimuth and the reference line in the image according to the angle that is input into the input field K16. In the example illustrated in FIG. 16, the angle in the image corresponds to "72.0093 DEGREES". In this way, the operator can easily comprehend the set azimuth d1 and the reference line L1.

Figure 17:
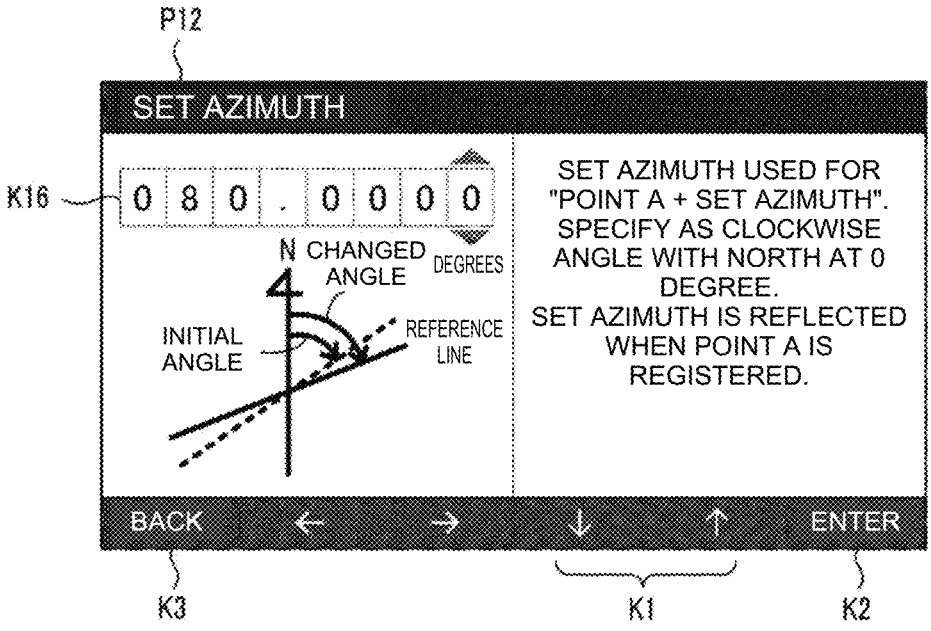
FIG. 17 is a view illustrating an example of the setting screen that is displayed in the operation device according to the embodiment of the present invention.
Figure 18:
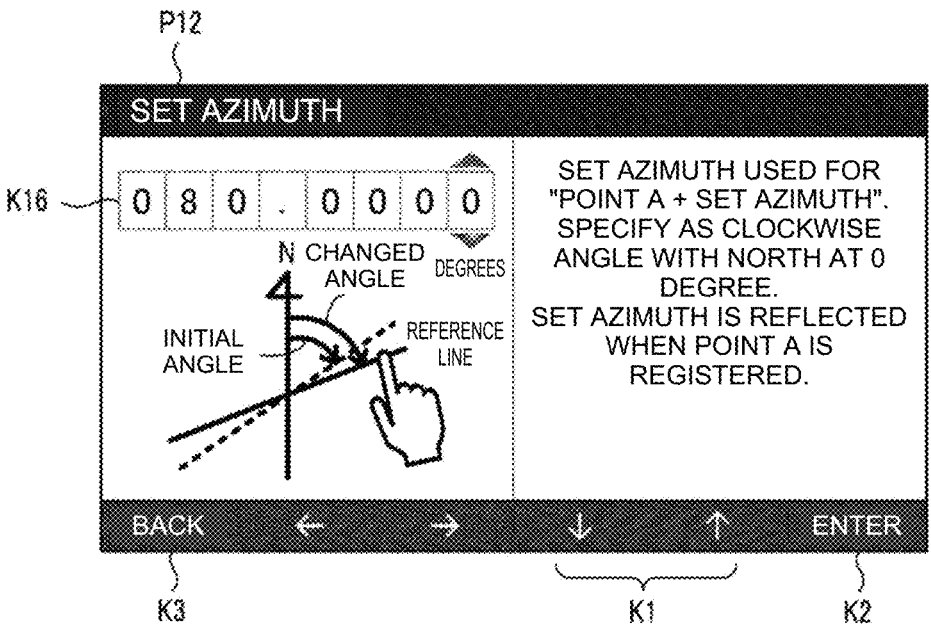
FIG. 18 is a view illustrating an example of the setting screen that is displayed in the operation device according to the embodiment of the present invention.

Furthermore, for example, in the case where the operator performs the angle change operation for the initial angle (the set azimuth d0 or the registered set azimuth), as illustrated in FIG. 17, the display processing unit 711 may display the initial angle and the changed angle in an identifiable manner. In this way, the operator can easily comprehend the reference lines L1 before and after the angle change. In addition, as illustrated in FIG. 18, in the case where the operator touches the reference line after the angle change, the display processing unit 711 may return the angle of the reference line to the initial angle.

Figure 19:
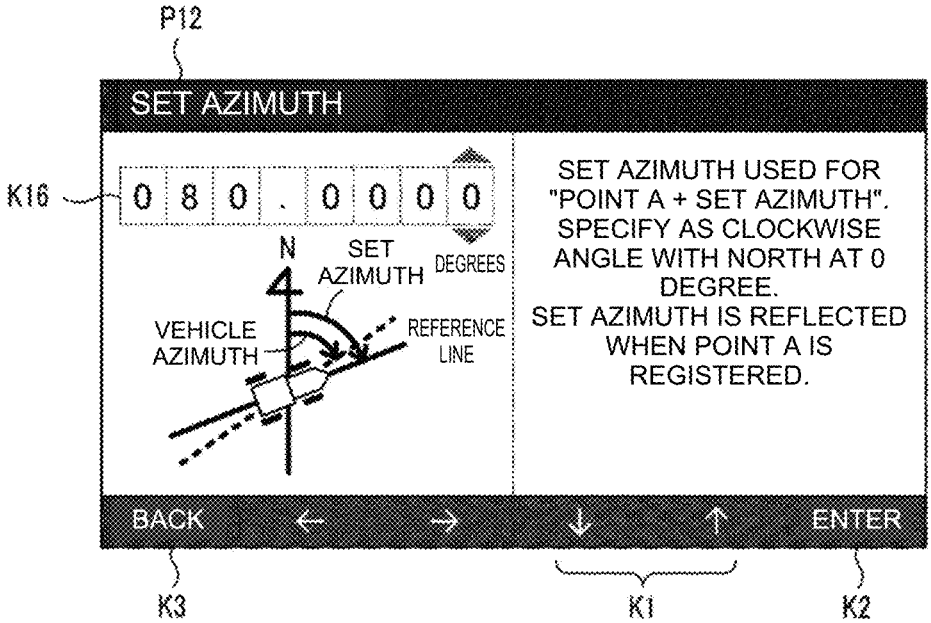
FIG. 19 is a view illustrating an example of the setting screen that is displayed in the operation device according to the embodiment of the present invention.

As illustrated in FIG. 19, the display processing unit 711 may display the image of the work vehicle 10. The display processing unit 711 may rotate the image according to the angle that is input into the input field K16.

As further another embodiment of the present invention, the storage unit 72 may store the one or plural set azimuths d0 (registered set azimuths), each of which is associated with the information on at least one of the field, the work vehicle 10, and a work type. In this case, the operation control unit 71 may set the angle, which is associated with information on a target for generating the target route R, as the set azimuth d0 (the initial angle). For example, the storage unit 72 may store set azimuth information DB (see FIG. 20). The set azimuth information DB includes information on "REGISTRATION DATE", "FIELD", "WORK VEHICLE", "WORK TYPE", and "SET AZIMUTH".

For example, in the case where, as the targets for generating the target route R, the field is "FIELD Fa", the work vehicle is "WORK VEHICLE A", and the work type is "WORK Wa", the operation control unit 71 sets "ANGLE Da", which is associated with these types of the information, as the set azimuth d0 (the initial angle).

With the above configuration, it is possible to generate the target route R by using the appropriate set azimuth, which matches the conditions, among the set azimuths registered in the past. Therefore, it is possible to improve the work accuracy by the work vehicle 10 and improve the workability of the route generation work.

As further another embodiment of the present invention, the setting processing unit 713 may set a work mode of the work vehicle 10 and identify (set) the route generation mode on the basis of the work mode.

More specifically, the setting processing unit 713 sets the work mode of the work vehicle 10 to one of a work accuracy priority mode (an example of the first work mode in the present invention), in which the autonomous travel of the work vehicle 10 is stopped when the positioning state by the positioning control unit 161 is lowered from a predetermined state, and a work continuation priority mode (an example of the second work mode in the present invention), in which the autonomous travel of the work vehicle 10 is continued when the positioning state by the positioning control unit 161 is lowered from the predetermined state. The predetermined state is a high accuracy state where RTK positioning is possible, for example.

Figure 21A:
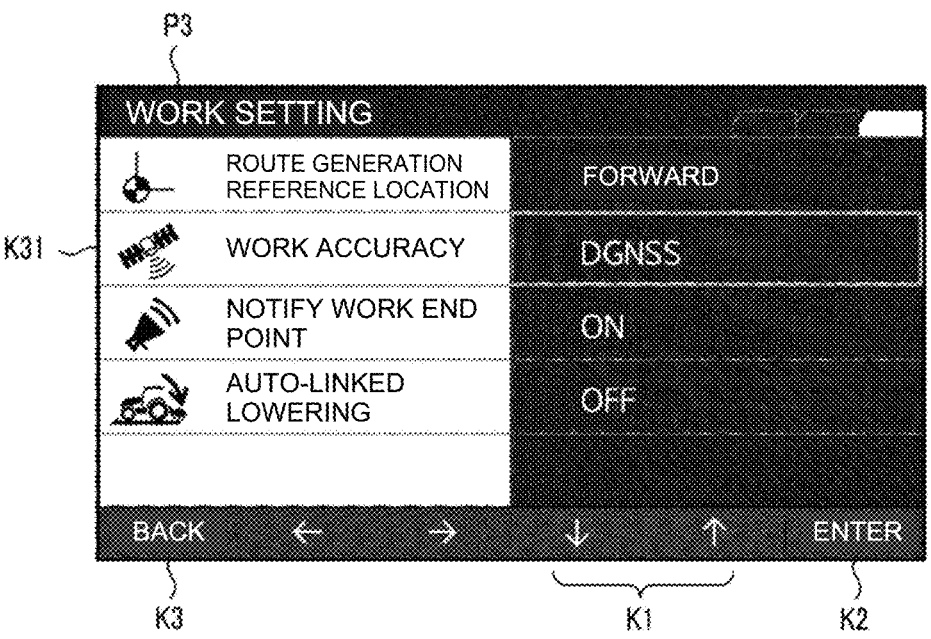
FIG. 21A is a view illustrating an example of the setting screen that is displayed in the operation device according to the embodiment of the present invention.
Figure 21B:
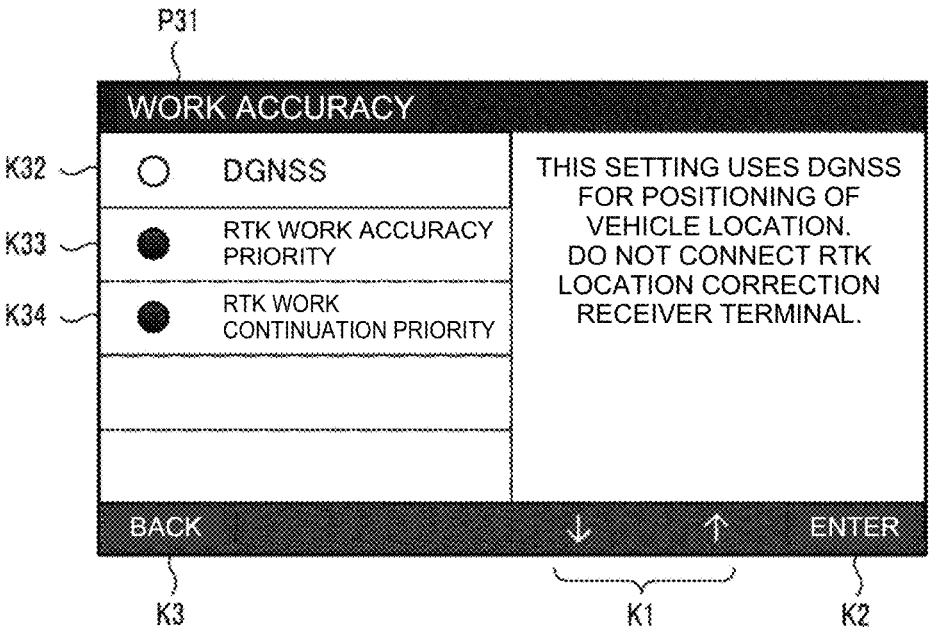
FIG. 21B is a view illustrating another example of the setting screen that is displayed in the operation device according to the embodiment of the present invention.

For example, the setting processing unit 713 sets the work mode on the basis of the operator's selection operation to select one of the work accuracy priority and the work continuation priority. More specifically, the operator selects "WORK ACCURACY" (a setting item K31) on a setting screen P3 illustrated in FIG. 21A, and then selects the work mode on a setting screen P31 (see FIG. 21B). The setting screen P31 includes "DGNSS" (a setting item K32), "RTK WORK ACCURACY PRIORITY" (a setting item K33), and "RTK WORK CONTINUATION PRIORITY" (a setting item K34). Here, DGNSS is a positioning method for positioning the work vehicle 10 on the basis of the positioning information (the GNSS signal or the like) that is received by a single receiver (the positioning antenna 164). When selecting the RTK method, the operator selects "WORK ACCURACY PRIORITY" or "WORK CONTINUATION PRIORITY". For example, in the case where it is desired to prevent lowering of the work accuracy (to prioritize the work accuracy) by temporarily stopping the autonomous travel when the positioning state is lowered, the operator selects "WORK ACCURACY PRIORITY". Meanwhile, for example, in the case where it is desired to prevent lowering of the work efficiency (to prioritize the work efficiency) by continuing the autonomous travel when the positioning state is lowered, the operator selects "WORK CONTINUATION PRIORITY".

In the case where the work mode is set to the work accuracy priority, the vehicle controller 11 causes the work vehicle 10 to travel autonomously on the basis of the location information by the RTK method when the positioning state is the high accuracy state. When the positioning state is lowered from the high accuracy state, the vehicle controller 11 stops (temporarily stops) the autonomous travel of the work vehicle 10. For example, when the positioning state is lowered due to an influence of an obstacle during the autonomous travel of the work vehicle 10, positioning accuracy is degraded. For this reason, the vehicle controller 11 temporarily stops the work vehicle 10. In the case where the positioning state is recovered and becomes the high accuracy state (completion of the high accuracy positioning) after the work vehicle 10 stops temporarily, the vehicle controller 11 resumes the autonomous travel of the work vehicle 10. In this way, it is possible to prevent the degradation of the work accuracy of the work vehicle 10.

Meanwhile, in the case where the work mode is set to the work continuation priority, the vehicle controller 11 causes the work vehicle 10 to travel autonomously on the basis of the location information by the RTK method when the positioning state is the high accuracy state. When the positioning state is lowered from the high accuracy state, the vehicle controller 11 causes the work vehicle 10 to travel autonomously on the basis of the location information by the DGNSS method or a DGPS method. For example, when the positioning state is lowered due to the influence of the obstacle during the autonomous travel of the work vehicle

10, the vehicle controller 11 switches the positioning method from the RTK method to the DGNSS method. Just as described, the vehicle controller 11 causes the work vehicle 10 to travel autonomously by positioning by the RTK method when the positioning state is the high accuracy state. Then, the vehicle controller 11 causes the work vehicle 10 to continue traveling autonomously by positioning by the DGNSS method when the positioning state is lowered. In this way, it is possible to prevent the degradation of the work efficiency of the work vehicle 10.

Figure 21C:
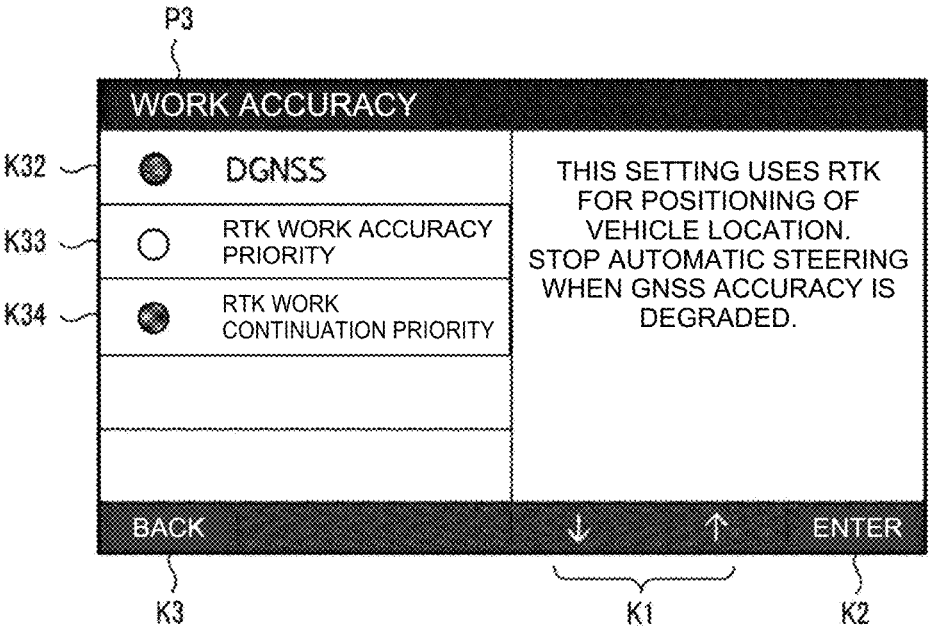
FIG. 21C is a view illustrating further another example of the setting screen that is displayed in the operation device according to the embodiment of the present invention.
Figure 21D:
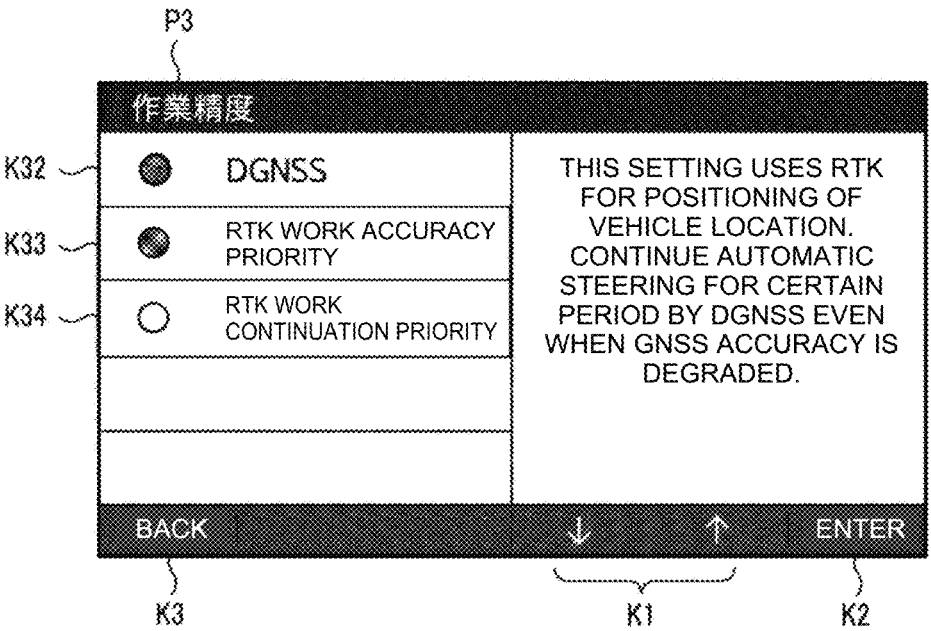
FIG. 21D is a view illustrating a further another example of the setting screen that is displayed in the operation device according to the embodiment of the present invention.

With the above configuration, the setting processing unit 713 may identify any of the plural route generation modes on the basis of the work mode. For example, when the work accuracy priority is selected (see FIG. 21C), the setting processing unit 713 identifies the first route generation mode. In addition, for example, when the work continuation priority is selected (see FIG. 21D), the setting processing unit 713 identifies the second route generation mode or the third route generation mode. Furthermore, in the case where the work continuation priority is selected and the set azimuth d0 that is set in the past (the registered set azimuth) is stored in the storage unit 72 in advance, the setting processing unit 713 may identify the third route generation mode.

When identifying the route generation mode, the setting processing unit 713 presents (suggests) such a route generation mode as a recommended mode to the operator. For example, when the work continuation priority is selected, the setting processing unit 713 presents the third route generation mode as the recommended mode to the operator. The setting processing unit 713 may display the recommended mode in the identifiable manner the setting screen P11 (see FIG. 5B). Just as described, the operation control unit 71 may present, to the operator, the route generation mode, which corresponds to the set work mode, of the plural route generation modes.

As another embodiment of the present invention, the setting processing unit 713 may identify the route generation mode from the plural route generation modes on the basis of at least one type of the information on the field, the work vehicle, and the work type. For example, the setting processing unit 713 identifies the third route generation mode when an area of the field F is equal or larger than a predetermined area, or identifies the first route generation mode or the second route generation mode when the area of the field F is smaller than the predetermined area. Alternatively, for example, the setting processing unit 713 identifies the third route generation mode in the case of the work vehicle 10 for which the set azimuth d1 is registered, or identifies the first route generation mode or the second route generation mode in the case of the work vehicle 10 for which the set azimuth d1 is not registered or the work vehicle 10 without a function to set the set azimuth d1. Further alternatively, for example, the setting processing unit 713 identifies the first route generation mode in the case of the work that requires the high accuracy, or identifies the second route generation mode or the third route generation mode in the case of the work that does not require the high accuracy.

As another embodiment of the present invention, in each of the first route generation mode, the second route generation mode, and the third route generation mode, the operation control unit 71 may execute the registration processing of the reference points (the point A and the point B) only through the operator's input operation on the operation device 17. For example, the operation control unit 71 causes the operation device 17 to display map information of the field F, and the operator specifies a desired location on a map. Then, the operation control unit 71 sets the reference point at the location that is specified by the operator. With such a configuration, the operator can register the reference point and generate the target route R without driving the work vehicle 10.

The work vehicle 10 in the present invention may also be able to travel autonomously when turning. In this case, the target route R includes the straight route and the turning road. In addition, in the work vehicle 10, the operator may be able to switch between the autonomous travel and the manual travel during the turn. Furthermore, the unmanned autonomous travel of the work vehicle 10 may be allowed on the target route R. In this case, the operator may remotely control the operation terminal to make the travel start instruction or the like. The operation terminal that is used for the remote control may be the operation device 17 according to the present embodiment or may include each of the processing units in the operation device 17.

The route generation system according to the present invention may be constructed of the operation device 17 alone or may be constructed of a server that includes each of the processing units provided in the operation device 17. The route generation system may be constructed of the work vehicle 10 that includes the operation device 17.

REFERENCE SIGNS LIST

1: Autonomous travel system
10: Work vehicle
11: Vehicle controller
12: Storage unit
13: Travel system
14: Work machine
15: Communication unit
16: Positioning device
17: Operation device
20: Satellite
71: Operation control unit
72: Storage unit
73: Operation display unit
711: Display processing unit
712: Acceptance processing unit
713: Setting processing unit (first setting processing unit, second setting processing unit)
714: Generation processing unit
B1: Autonomous travel button
D1: Work screen (second screen)
P12: Setting screen (first screen)
F: Field
L1: Reference line
R: Target route
d0: Set azimuth (registered set angle)
d1: Set azimuth (set angle)

The invention claimed is:

1. A processor-implemented route generation method for generating a target route on which a work vehicle travels autonomously in a field, the route generation method comprising:

setting a set angle that is an angle with respect to a reference orientation;

setting a reference point at a predetermined location in the field;

generating the target route on the basis of the set angle and a reference line that passes through the reference point; and initiating travel by the work vehicle on the target route.

2. The route generation method according to claim 1, wherein setting the reference point further comprises:

setting the reference point at a location of the work
vehicle in the field.

3. The route generation method according to claim 1,
wherein generating the target route further comprises:
  generating the target route including the reference line
    that passes through the reference point and extends at
    the set angle with respect to the reference orientation.

4. The route generation method according to claim 1,
wherein setting the set angle further comprises:
  setting, as the set angle, a registered set angle that is
    registered in the past when the registered set angle is
    stored in a storage unit in advance.

5. The route generation method according to claim 4,
wherein setting, as the set angle, the registered set angle
further comprises:
  selecting the registered set angle from one or plural stored
    registered set angles stored in the storage unit, wherein
    each stored registered set angle is associated with at
    least one type of information, the at least one type of
    information pertaining to the field, the work vehicle,
    and a work type, and
  setting, as the set angle, the selected registered set angle,
    wherein the selected registered set angle is associated
    with the at least one type of information that corre-
    sponds to a target for generating the target route.

6. The route generation method according to claim 4,
wherein setting, as the set angle, the registered set angle
further comprises:
  displaying the registered set angle, which is stored in the
    storage unit, on a first screen; and
  setting the registered set angle, which has been changed,
    to the set angle when a change operation of the regis-
    tered set angle on the first screen is accepted from an
    operator.

7. The route generation method according to claim 1,
wherein initiating travel by the work vehicle on the target
route further comprises:
  setting an orientation of the work vehicle at a current
    location in the field to the set angle.

8. The route generation method according to claim 1,
wherein setting the set angle further comprises:

displaying a first screen on which an input operation of an
  angle with respect to the reference orientation is
  accepted from an operator; and
setting the angle, which is input by the operator, to the set
  angle.

9. The route generation method according to claim 1,
wherein setting the reference point further comprises:
  displaying a second screen on which a setting operation of
    the reference point is accepted from an operator.

10. The route generation method according to claim 9,
wherein generating the target route further comprises:
  generating the target route and displaying the target route
    on the second screen in the case where a setting
    operation of the reference point on the second screen is
    accepted from the operator.

11. A route generation system for generating a target route
on which a work vehicle travels autonomously in a field, the
route generation system comprising:
  a first setting processing unit that sets a set angle as an
    angle with respect to a reference orientation;
  a second setting processing unit that sets a reference point
    at a predetermined location in the field; and
  a generation processing unit that generates the target route
    on the basis of the set angle and a reference line passing
    through the reference point; and
  a vehicle control unit that initiates travel by the work
    vehicle on the target route.

12. A non-transitory computer-readable medium compris-
ing instructions to configure a processor to execute a route
generation method for generating a target route on which a
work vehicle travels autonomously in a field, the method
comprising:
  setting a set angle that is an angle with respect to a
    reference orientation;
  setting a reference point at a predetermined location in the
    field; and
  generating the target route on the basis of the set angle and
    a reference line that passes through the reference point;
    and
  initiating travel by the work vehicle on the target route.

* * * * *